US012602947B2

(12) United States Patent
Sathi et al.

(10) Patent No.: US 12,602,947 B2
(45) Date of Patent: Apr. 14, 2026

(54) METHOD AND SYSTEM FOR EXTRACTING DATA FROM DOCUMENTS AND AUTOMATICALLY MODIFYING DATA ITEM OF THE EXTRACTED DATA BASED ON GUIDANCE RETRIEVED FROM FEEDBACK FILE

(71) Applicant: Automation Anywhere, Inc., San Jose, CA (US)

(72) Inventors: Siddharth Sathi, Milpitas, CA (US); Anish Hiranandani, Milpitas, CA (US); Vibhas Gejji, Fremont, CA (US); Alexander Timoshenko, Fremont, CA (US); Sheeba Ann George, Santa Clara, CA (US); Prabhanjan Kumar Nag, Fremont, CA (US)

(73) Assignee: AUTOMATION ANYWHERE INC., San Jose, CA (US)

( * ) Notice: Subject to any disclaimer, the term of this patent is extended or adjusted under 35 U.S.C. 154(b) by 281 days.

(21) Appl. No.: 18/381,042

(22) Filed: Oct. 17, 2023

(65) Prior Publication Data

US 2024/0242527 A1    Jul. 18, 2024

Related U.S. Application Data

(60) Provisional application No. 63/417,296, filed on Oct. 18, 2022.

(51) Int. Cl.
*G06V 30/416* (2022.01)
*G06F 40/166* (2020.01)
(Continued)

(52) U.S. Cl.
CPC .......... *G06V 30/416* (2022.01); *G06F 40/166* (2020.01); *G06V 10/20* (2022.01); *G06V 10/768* (2022.01); *G06V 30/10* (2022.01)

(58) Field of Classification Search
None
See application file for complete search history.

(56) References Cited

U.S. PATENT DOCUMENTS 5,949,999 A    9/1999    Song et al.
5,983,001 A    11/1999    Boughner et al.
(Continued)

FOREIGN PATENT DOCUMENTS

EP    3133539    2/2017
EP    3675008    7/2020
(Continued)

OTHER PUBLICATIONS

Al Sallami, Load Balanoing in Green Cloud Computation, Proceedings of the World Congress on Engineering 2013 vol. II, WCE 2013, 2013, pp. 1-5 (Year: 2013).
(Continued)

*Primary Examiner* — Haris Sabah
(74) *Attorney, Agent, or Firm* — Jason A. Smith; Shumaker, Loop & Kendrick, LLP

(57) ABSTRACT

Improved techniques for extraction of data from documents, namely, from images of documents, so as to better enable software automation. The software automation can, for example, be provided by software robots of RPA systems. The improved techniques can provide automated feedback-based modification of data extracted from an image of a document through use of previously used validation guidance provided by a user in validating extracted data from a same or similar document. In one embodiment, the automated feedback-based modification can locate an appropriate feedback file through use of document fingerprints and document clusters. Then, guidance from the appropriate feedback file can be used to automatically modify at least a portion of the data extracted data from the image based on the guidance retrieved from the feedback file. Advanta-
(Continued)

geously, the improved techniques can reduce the need for user participation in validation of data extracted from images of documents, and yield greater and more accurate automated data extraction.

36 Claims, 22 Drawing Sheets

(51) Int. Cl.
| | |
|---|---|
| *G06V 10/20* | (2022.01) |
| *G06V 10/70* | (2022.01) |
| *G06V 30/10* | (2022.01) |

(56) References Cited

U.S. PATENT DOCUMENTS

| | | | |
|---|---|---|---|
| 6,118,939 | A | 9/2000 | Nack |
| 6,133,917 | A | 10/2000 | Feigner et al. |
| 6,226,407 | B1 | 5/2001 | Zabih et al. |
| 6,389,592 | B1 * | 5/2002 | Ayres ..................... G06F 8/658 |
| | | | 717/172 |
| 6,427,234 | B1 | 7/2002 | Chambers et al. |
| 6,473,794 | B1 | 10/2002 | Guheen et al. |
| 6,490,449 | B1 | 12/2002 | Thibert |
| 6,496,979 | B1 | 12/2002 | Chen et al. |
| 6,640,244 | B1 | 10/2003 | Bowman-Amuah |
| 6,704,873 | B1 | 3/2004 | Underwood |
| 6,898,764 | B2 | 5/2005 | Kemp |
| 6,954,747 | B1 | 10/2005 | Wang et al. |
| 6,957,186 | B1 | 10/2005 | Guheen et al. |
| 7,091,898 | B2 | 8/2006 | Arling et al. |
| 7,246,128 | B2 | 7/2007 | Jordahl |
| 7,398,469 | B2 | 7/2008 | Kisamore et al. |
| 7,441,007 | B1 | 10/2008 | Kirkpatrick et al. |
| 7,533,096 | B2 | 5/2009 | Rice et al. |
| 7,568,109 | B2 | 7/2009 | Powell et al. |
| 7,571,427 | B2 | 8/2009 | Wang et al. |
| 7,765,525 | B1 | 7/2010 | Davidson et al. |
| 7,783,135 | B2 | 8/2010 | Gokturk |
| 7,805,317 | B2 | 9/2010 | Khan et al. |
| 7,805,710 | B2 | 9/2010 | North |
| 7,810,070 | B2 | 10/2010 | Nasuti et al. |
| 7,846,023 | B2 | 12/2010 | Evans et al. |
| 8,028,269 | B2 | 9/2011 | Bhatia et al. |
| 8,056,092 | B2 | 11/2011 | Allen et al. |
| 8,095,910 | B2 | 1/2012 | Nathan et al. |
| 8,132,156 | B2 | 3/2012 | Malcolm |
| 8,209,738 | B2 | 6/2012 | Nicol et al. |
| 8,234,622 | B2 | 7/2012 | Meijer et al. |
| 8,245,215 | B2 | 8/2012 | Extra |
| 8,352,464 | B2 | 1/2013 | Fotev |
| 8,365,147 | B2 | 1/2013 | Grechanik |
| 8,396,890 | B2 | 3/2013 | Lim |
| 8,438,558 | B1 | 5/2013 | Adams |
| 8,443,291 | B2 | 5/2013 | Ku et al. |
| 8,464,240 | B2 | 6/2013 | Fritsch et al. |
| 8,498,473 | B2 | 7/2013 | Chong et al. |
| 8,504,803 | B2 | 8/2013 | Shukla |
| 8,631,458 | B1 | 1/2014 | Banerjee |
| 8,682,083 | B2 | 3/2014 | Kumar et al. |
| 8,713,003 | B2 | 4/2014 | Fotev |
| 8,724,907 | B1 | 5/2014 | Sampson et al. |
| 8,769,482 | B2 | 7/2014 | Batey et al. |
| 8,819,241 | B1 | 8/2014 | Washbum |
| 8,819,253 | B2 | 8/2014 | Simeloff |
| 8,832,048 | B2 | 9/2014 | Lim |
| 8,874,685 | B1 | 10/2014 | Hollis et al. |
| 8,943,493 | B2 | 1/2015 | Schneider |
| 8,965,905 | B2 | 2/2015 | Ashmore et al. |
| 8,966,458 | B2 | 2/2015 | Asai |
| 9,032,314 | B2 | 5/2015 | Mital et al. |
| 9,104,294 | B2 | 8/2015 | Forstall et al. |
| 9,171,359 | B1 | 10/2015 | Lund |
| 9,213,625 | B1 | 12/2015 | Schrage |
| 9,251,413 | B2 | 2/2016 | Meler |
| 9,278,284 | B2 | 3/2016 | Ruppert et al. |
| 9,444,844 | B2 | 9/2016 | Edery et al. |
| 9,462,042 | B2 | 10/2016 | Shukla et al. |
| 9,571,332 | B2 | 2/2017 | Subramaniam et al. |
| 9,600,519 | B2 | 3/2017 | Schoning et al. |
| 9,621,584 | B1 | 4/2017 | Schmidt et al. |
| 9,934,063 | B2 | 4/2018 | Kaina |
| 9,934,129 | B1 | 4/2018 | Budurean |
| 9,946,233 | B2 | 4/2018 | Brun et al. |
| 9,965,139 | B2 | 5/2018 | Nychis |
| 9,990,347 | B2 | 6/2018 | Raskovic et al. |
| 10,015,503 | B1 | 7/2018 | Ahammad |
| 10,043,255 | B1 | 8/2018 | Pathapati et al. |
| 10,282,280 | B1 | 5/2019 | Gouskova |
| 10,489,682 | B1 | 11/2019 | Kumar et al. |
| 10,542,030 | B2 | 1/2020 | Oberheide |
| 10,552,540 | B2 | 2/2020 | Marascu et al. |
| 10,592,738 | B2 | 3/2020 | Northrup |
| 10,654,166 | B1 | 5/2020 | Hall |
| 10,706,218 | B2 | 7/2020 | Milward et al. |
| 10,706,228 | B2 | 7/2020 | Buisson |
| 10,713,068 | B1 | 7/2020 | Zohar |
| 10,936,807 | B1 | 3/2021 | Walters |
| 10,963,731 | B2 | 3/2021 | Sarkar |
| 11,099,972 | B2 | 8/2021 | Puszkiewicz |
| 11,176,443 | B1 | 11/2021 | Selva |
| 11,182,178 | B1 | 11/2021 | Singh et al. |
| 11,182,604 | B1 | 11/2021 | Methaniya |
| 11,210,075 | B2 | 12/2021 | Bond |
| 11,243,803 | B2 | 2/2022 | Anand et al. |
| 11,263,391 | B2 | 3/2022 | Potts |
| 11,348,353 | B2 | 5/2022 | Sundell et al. |
| 11,500,952 | B1 | 11/2022 | Gupta |
| 11,614,731 | B2 | 3/2023 | Anand et al. |
| 11,642,783 | B2 | 5/2023 | Han et al. |
| 11,693,923 | B1 | 7/2023 | Pallikonda |
| 11,775,321 | B2 | 10/2023 | Singh et al. |
| 11,775,339 | B2 | 10/2023 | Anand et al. |
| 11,775,814 | B1 | 10/2023 | Anand et al. |
| 11,782,734 | B2 | 10/2023 | Ginoya et al. |
| 11,820,020 | B2 | 11/2023 | Goyal et al. |
| 11,919,165 | B2 | 3/2024 | Singh |
| 11,954,008 | B2 | 4/2024 | Kakhandiki et al. |
| 12,002,245 | B2 | 6/2024 | Srivastava |
| 12,017,362 | B2 | 6/2024 | Yu |
| 12,190,620 | B2 | 1/2025 | Sathi et al. |
| 12,197,927 | B2 | 1/2025 | Goyal et al. |
| 2002/0029232 | A1 | 3/2002 | Bobrow et al. |
| 2002/0129039 | A1 | 9/2002 | Majewsku |
| 2003/0033590 | A1 | 2/2003 | Leherbauer |
| 2003/0101245 | A1 | 5/2003 | Srinivasan et al. |
| 2003/0114959 | A1 | 6/2003 | Sakamoto |
| 2003/0159089 | A1 | 8/2003 | DiJoseph |
| 2004/0083472 | A1 | 4/2004 | Rao et al. |
| 2004/0122906 | A1 | 6/2004 | Goodman |
| 2004/0153649 | A1 | 8/2004 | Rhoads |
| 2004/0172526 | A1 | 9/2004 | Tann et al. |
| 2004/0210885 | A1 | 10/2004 | Wang et al. |
| 2004/0243994 | A1 | 12/2004 | Nasu |
| 2005/0033777 | A1 | 2/2005 | Moraes |
| 2005/0188357 | A1 | 8/2005 | Derks et al. |
| 2005/0204343 | A1 | 9/2005 | Kisamore et al. |
| 2005/0257214 | A1 | 11/2005 | Moshir et al. |
| 2006/0095276 | A1 | 5/2006 | Axelrod et al. |
| 2006/0150188 | A1 | 7/2006 | Roman et al. |
| 2006/0218110 | A1 | 9/2006 | Simske et al. |
| 2007/0030528 | A1 | 2/2007 | Quaeler et al. |
| 2007/0089101 | A1 | 4/2007 | Romanovskiy |
| 2007/0101291 | A1 | 5/2007 | Forstall et al. |
| 2007/0112574 | A1 | 5/2007 | Greene |
| 2007/0156677 | A1 | 7/2007 | Szabo |
| 2007/0172063 | A1 | 7/2007 | Biggs |
| 2007/0233741 | A1 | 10/2007 | Shen |
| 2008/0005086 | A1 | 1/2008 | Moore |
| 2008/0027769 | A1 | 1/2008 | Eder |
| 2008/0028392 | A1 | 1/2008 | Chen et al. |
| 2008/0133052 | A1 | 6/2008 | Jones |
| 2008/0209392 | A1 | 8/2008 | Able et al. |

(56) References Cited

U.S. PATENT DOCUMENTS

| | | |
|---|---|---|
| 2008/0222454 A1 | 9/2008 | Kelso |
| 2008/0263024 A1 | 10/2008 | Landschaft et al. |
| 2008/0310625 A1 | 12/2008 | Vanstone |
| 2009/0037509 A1 | 2/2009 | Parekh et al. |
| 2009/0103769 A1 | 4/2009 | Milov et al. |
| 2009/0116071 A1 | 5/2009 | Mantell |
| 2009/0172814 A1 | 7/2009 | Khosravi et al. |
| 2009/0199160 A1 | 8/2009 | Vaitheeswaran et al. |
| 2009/0217309 A1 | 8/2009 | Grechanik et al. |
| 2009/0249297 A1 | 10/2009 | Doshi et al. |
| 2009/0304295 A1 | 12/2009 | Mori |
| 2009/0313229 A1 | 12/2009 | Fellenstein et al. |
| 2009/0320002 A1 | 12/2009 | Peri-Glass et al. |
| 2010/0023602 A1 | 1/2010 | Martone |
| 2010/0023933 A1 | 1/2010 | Bryant et al. |
| 2010/0077475 A1 | 3/2010 | Deschenes |
| 2010/0100605 A1 | 4/2010 | Allen et al. |
| 2010/0106671 A1 | 4/2010 | Li et al. |
| 2010/0138015 A1 | 6/2010 | Colombo et al. |
| 2010/0235433 A1 | 9/2010 | Ansari et al. |
| 2010/0251163 A1 | 9/2010 | Keable |
| 2010/0275113 A1 | 10/2010 | Bastos dos Santos |
| 2011/0022578 A1 | 1/2011 | Fotev |
| 2011/0047488 A1 | 2/2011 | Butin |
| 2011/0055484 A1 | 3/2011 | Eichenberger |
| 2011/0106284 A1 | 5/2011 | Catoen |
| 2011/0145807 A1 | 6/2011 | Molinie et al. |
| 2011/0197121 A1 | 8/2011 | Kletter |
| 2011/0258195 A1 | 10/2011 | Welling |
| 2011/0267490 A1 | 11/2011 | Goktekin |
| 2011/0276568 A1 | 11/2011 | Fotev |
| 2011/0276946 A1 | 11/2011 | Pletter |
| 2011/0302570 A1 | 12/2011 | Kurimilla et al. |
| 2012/0011458 A1 | 1/2012 | Xia et al. |
| 2012/0042281 A1 | 2/2012 | Green |
| 2012/0124062 A1 | 5/2012 | Macbeth et al. |
| 2012/0131456 A1 | 5/2012 | Lin et al. |
| 2012/0143941 A1 | 6/2012 | Kim |
| 2012/0266149 A1 | 10/2012 | Lebert |
| 2012/0324333 A1 | 12/2012 | Lehavi |
| 2012/0330940 A1 | 12/2012 | Caire et al. |
| 2013/0145006 A1 | 6/2013 | Tammam |
| 2013/0173648 A1 | 7/2013 | Tan et al. |
| 2013/0227535 A1 | 8/2013 | Kannan |
| 2013/0236111 A1 | 9/2013 | Pintsov |
| 2013/0290318 A1 | 10/2013 | Shapira et al. |
| 2013/0301935 A1 | 11/2013 | Xue |
| 2013/0343652 A1* | 12/2013 | Goto ................... G06V 30/15 |
| | | 382/182 |
| 2014/0036290 A1 | 2/2014 | Miyagawa |
| 2014/0045484 A1 | 2/2014 | Kim et al. |
| 2014/0075371 A1 | 3/2014 | Carmi |
| 2014/0181705 A1 | 6/2014 | Hey et al. |
| 2014/0189576 A1 | 7/2014 | Carmi |
| 2014/0282125 A1 | 9/2014 | Duneau |
| 2014/0379666 A1 | 12/2014 | Bryon |
| 2015/0082159 A1* | 3/2015 | DeLuca ............... G06V 30/414 |
| | | 715/271 |
| 2015/0082280 A1 | 3/2015 | Betak et al. |
| 2015/0121179 A1 | 4/2015 | Saund |
| 2015/0235193 A1 | 8/2015 | Cummings |
| 2015/0301926 A1 | 10/2015 | Giannelos |
| 2015/0310268 A1 | 10/2015 | He |
| 2015/0347284 A1 | 12/2015 | Hey et al. |
| 2016/0019049 A1 | 1/2016 | Kakhandiki et al. |
| 2016/0034441 A1 | 2/2016 | Nguyen et al. |
| 2016/0055376 A1 | 2/2016 | Koduru |
| 2016/0063269 A1 | 3/2016 | Liden |
| 2016/0078368 A1 | 3/2016 | Kakhandiki et al. |
| 2017/0091615 A1 | 3/2017 | Liu |
| 2017/0221032 A1 | 8/2017 | Mazed |
| 2017/0270431 A1 | 9/2017 | Hosabettu |
| 2018/0063258 A1 | 3/2018 | Wang |
| 2018/0113781 A1 | 4/2018 | Kim |
| 2018/0144042 A1 | 5/2018 | Sheng |
| 2018/0176416 A1 | 6/2018 | Ewans |
| 2018/0210824 A1 | 7/2018 | Kochura |
| 2018/0218429 A1 | 8/2018 | Guo et al. |
| 2018/0267885 A1 | 9/2018 | Budurean |
| 2018/0275835 A1 | 9/2018 | Prag |
| 2018/0276462 A1 | 9/2018 | Davis |
| 2018/0321955 A1 | 11/2018 | Liu |
| 2018/0322403 A1 | 11/2018 | Ron |
| 2018/0349730 A1 | 12/2018 | Dixon |
| 2018/0370029 A1 | 12/2018 | Hall |
| 2019/0005050 A1 | 1/2019 | Proux |
| 2019/0026215 A1 | 1/2019 | Agarwal |
| 2019/0028587 A1 | 1/2019 | Unitt |
| 2019/0034041 A1 | 1/2019 | Nychis |
| 2019/0066012 A1 | 2/2019 | Abell |
| 2019/0075169 A1 | 3/2019 | Behunin |
| 2019/0095440 A1 | 3/2019 | Chakra |
| 2019/0114370 A1 | 4/2019 | Cerino |
| 2019/0126463 A1 | 5/2019 | Purushothaman |
| 2019/0130094 A1 | 5/2019 | Votaw |
| 2019/0141596 A1 | 5/2019 | Gay |
| 2019/0188462 A1 | 6/2019 | Nishida |
| 2019/0205636 A1 | 7/2019 | Saraswat |
| 2019/0213822 A1 | 7/2019 | Jain |
| 2019/0250891 A1 | 8/2019 | Kumar |
| 2019/0266692 A1 | 8/2019 | Stach et al. |
| 2019/0310868 A1 | 10/2019 | Vaindiner |
| 2019/0317803 A1 | 10/2019 | Maheshwari |
| 2019/0324781 A1 | 10/2019 | Ramamurthy |
| 2019/0332508 A1 | 10/2019 | Goyal |
| 2019/0340240 A1 | 11/2019 | Duta |
| 2019/0354720 A1 | 11/2019 | Tucker |
| 2019/0377987 A1 | 12/2019 | Price et al. |
| 2020/0019767 A1 | 1/2020 | Porter et al. |
| 2020/0034976 A1 | 1/2020 | Stone et al. |
| 2020/0058387 A1 | 2/2020 | Stahel |
| 2020/0059441 A1 | 2/2020 | Viet |
| 2020/0065384 A1 | 2/2020 | Costello |
| 2020/0074070 A1 | 3/2020 | Boodaei |
| 2020/0097742 A1 | 3/2020 | Kumar et al. |
| 2020/0104350 A1 | 4/2020 | Allen |
| 2020/0125635 A1 | 4/2020 | Nuolf |
| 2020/0147791 A1 | 5/2020 | Safary |
| 2020/0151444 A1 | 5/2020 | Price et al. |
| 2020/0151591 A1 | 5/2020 | Li |
| 2020/0159647 A1 | 5/2020 | Puszkiewicz |
| 2020/0159648 A1 | 5/2020 | Ghare |
| 2020/0249964 A1 | 8/2020 | Fernandes |
| 2020/0257764 A1 | 8/2020 | Reisswig |
| 2020/0273078 A1 | 8/2020 | Xu |
| 2020/0285353 A1 | 9/2020 | Rezazadeh Sereshkeh |
| 2020/0311210 A1 | 10/2020 | Nama |
| 2020/0334249 A1 | 10/2020 | Canim |
| 2020/0342032 A1 | 10/2020 | Subramaniam |
| 2020/0364291 A1 | 11/2020 | Bentabet |
| 2020/0410082 A1 | 12/2020 | Sharieh |
| 2021/0019157 A1 | 1/2021 | Voicu |
| 2021/0042516 A1 | 2/2021 | Panakkal |
| 2021/0049128 A1 | 2/2021 | Kernick |
| 2021/0067492 A1 | 3/2021 | Mastracci |
| 2021/0073326 A1 | 3/2021 | Aggarwal |
| 2021/0107140 A1 | 4/2021 | Singh |
| 2021/0117742 A1 | 4/2021 | Gligan |
| 2021/0141497 A1 | 5/2021 | Magureanu |
| 2021/0216334 A1 | 7/2021 | Barrett |
| 2021/0248153 A1 | 8/2021 | Sirangimoorthy |
| 2021/0279166 A1 | 9/2021 | Peng |
| 2021/0288823 A1 | 9/2021 | Foth |
| 2021/0333983 A1 | 10/2021 | Singh |
| 2021/0366099 A1 | 11/2021 | Liao |
| 2021/0391004 A1 | 12/2021 | Yudanov |
| 2022/0032471 A1 | 2/2022 | Singh |
| 2022/0038445 A1 | 2/2022 | LeClair |
| 2022/0138309 A1 | 5/2022 | Barnett |
| 2022/0197255 A1 | 6/2022 | Cella |
| 2022/0245936 A1 | 8/2022 | Valk |
| 2022/0318224 A1 | 10/2022 | Thompson |
| 2022/0326974 A1 | 10/2022 | Bond |
| 2022/0335240 A1 | 10/2022 | Smock |

(56) References Cited

U.S. PATENT DOCUMENTS

| | | | | |
|---|---|---|---|---|
| 2022/0405094 | A1 | 12/2022 | Farquhar | |
| 2022/0405503 | A1* | 12/2022 | Kaza | G06V 10/774 |
| 2022/0413997 | A1 | 12/2022 | Shi | |
| 2023/0052190 | A1 | 2/2023 | Goyal et al. | |
| 2023/0053260 | A1 | 2/2023 | Goyal et al. | |
| 2023/0083893 | A1 | 3/2023 | Craft | |
| 2023/0162344 | A1* | 5/2023 | Zhao | G06T 7/0004 |
| | | | | 382/141 |
| 2023/0214239 | A1 | 7/2023 | Singh | |
| 2023/0283604 | A1 | 9/2023 | Griffin | |
| 2023/0419711 | A1 | 12/2023 | Ramnath | |
| 2024/0004851 | A1 | 1/2024 | Zhang | |
| 2024/0056479 | A1 | 2/2024 | Senecal | |
| 2024/0281474 | A1 | 8/2024 | Craft | |
| 2025/0110810 | A1 | 4/2025 | Gajera | |

FOREIGN PATENT DOCUMENTS

| | | |
|---|---|---|
| WO | 2019/092672 A2 | 5/2019 |
| WO | 2022/076488 | 4/2022 |

OTHER PUBLICATIONS

B.P. Kasper "Remote: A Means of Remotely Controlling and Storing Data from a HAL Quadrupole Gass Analyzer Using an IBM-PC Compatible Computer", Nov. 15, 1995, Space and Environment Technology Center.
Bergen et al., RPC automation: making legacy code releant, May 2013, 6 pages.
Hu et al., Automating GUI testing for Android applications, May 2011, 7 pages.
Konstantinou et al., An architecture for virtual solution composition and deployment in infrastructure clouds, 9 pages (Year: 2009).
Nyulas et al., An Ontology-Driven Framework for Deploying JADE Agent Systems, 5 pages (Year: 2006).
Tom Yeh, Tsung-Hsiang Chang, and Robert C. Miller, Sikuli: Using GUI Screenshots for Search and Automation, Oct. 4-7, 2009, 10 pages.
Yu et al., Deplying and managing Web services: issues, solutions, and directions, 36 pages (Year: 2008).
Zhifang et al., Test automation on moble device, May 2010, 7 pages.
Non-Final Office Action for U.S. Appl. No. 17/230,492, mailed Oct. 14, 2022.
Notice of Allowance for U.S. Appl. No. 16/398,532, mailed Oct. 23, 2022.
Non-Final Office Action for U.S. Appl. No. 16/876,530, mailed Sep. 29, 2020.
Final Office Action for U.S. Appl. No. 16/876,530, mailed Apr. 13, 2021.
Notice of Allowance for U.S. Appl. No. 16/876,530, mailed Jul. 22, 2021.
Dai, Jifeng et al., "R-fcn: Object detectiom via region-based fully convolutional networks", Advances in neural information processing systems 29 (2016). (Year: 2016).
Ren, Shaoqing et al., "Faster r-cnn: Towards real0time object detection with region proposal network." Advances in neutral information processing systems 28 (2015). (Year: 2015).
Zhifang et al., Test automation on mobile device, May 2010, 7 pages.
Dai, Jifeng et al., "R-fcn: Object detection via region-based fully convolutional networks", Advances in neural information processing systems 29 (2016). (Year: 2016).
International Search Report for PCT/US2021/053669, dated May 11, 2022.
Embley et al., "Table-processing paradigms: a research survey", International Journal on Document Analysis and Recognition, vol. 8, No. 2-3, May 9, 2006, pp. 66-86.
Non-Final Office Action for U.S. Appl. No. 16/925,956, mailed Sep. 16, 2021.

Notice of Allowance for U.S. Appl. No. 16/925,956, mailed Jan. 7, 2022.
Pre-Interview Office Action for U.S. Appl. No. 16/398,532, mailed Jul. 8, 2022.
Notice of Allowance for U.S. Appl. No. 16/398,532, mailed Oct. 13, 2022.
Non-Final Office Action for U.S. Appl. No. 17/139,838, mailed Feb. 22, 2022.
Final Office Action for U.S. Appl. No. 17/139,838, mailed Nov. 15, 2022.
Notice of Allowance for U.S. Appl. No. 17/139,838, mailed Apr. 5, 2023.
International Search Report and Written Opinion for PCT/US2021/015691, mailed May 11, 2021.
A density-based algorithm for discovering clusters in large spatial databases with noise, Ester, Martin; Kriegel, Hans-Peter; Sander, Jorg; Xu, Xiaowei, Simoudis, Evangelos; Han, Jiawei; Fayyad, Usama M., eds., Proceedings of the Second International Conference on Knowledge Discovery and Data Mining (KDD-96). AMI Press. pp. 226-231 (1996).
Deep Residual Learning for Image Recognition, by K. He, X. Zhang, S. Ren, and J. Sun, arXiv:1512.03385 (2015).
FaceNet: A Unified Embedding for Face Recognition and Clustering, by F. Schroff, D. Kalenichenko, J. Philbin, arXiv:1503.03832 (2015).
Luqman, et al. "Fuzzy multilevel graph embedding", copyright 2012 Elsevier Ltd.
Sharma et al. Determining similarity in histological images using graph-theoretic description and matching methods for content-based image retrieval in medical diagnostics, Biomed Center, copyright 2012.
First Action Interview Pilot Program Pre-Interview communication for U.S. Appl. No. 16/779,462, mailed Dec. 3, 2021.
Reply under 37 CDT 1.111 to Pre-Interview Communication for U.S. Appl. No. 16/779,462, filed Jan. 25, 2022.
Notice of Allowance for U.S. Appl. No. 17/131,674 mailed Feb. 9, 2022.
Notice of Allowance for U.S. Appl. No. 17/131,674, mailed Jun. 22, 2023.
Non-Final Office Action for U.S. Appl. No. 16/731,044, mailed Jan. 25, 2021.
Notice of Allowance for U.S. Appl. No. 16/731,044, mailed May 5, 2021.
Non-Final Office Action for U.S. Appl. No. 18/126,935, mailed Jul. 13, 2023.
Ndn-Final Office Action for U.S. Appl. No. 17/139,842, mailed Jul. 18, 2023.
Notice of Allowance for U.S. Appl. No. 17/588,588, mailed Aug. 2, 2023.
Pre-Interview Office Action for U.S. Appl. No. 16/859,488, mailed Jan. 25, 2021.
First Action Interview for U.S. Appl. No. 16/859,488, mailed Mar. 22, 2021.
Final Office Action for U.S. Appl. No. 16/859,488, mailed Jul. 8, 2021.
Notice of Allowance for U.S. Appl. No. 16/859,488, mailed Mar. 30, 2022.
Final Office Action for U.S. Appl. No. 17/463,494, mailed Sep. 6, 2023.
Final Office Action for U.S. Appl. No. 17/160,080, mailed Sep. 11, 2023.
Final Office Action for U.S. Appl. No. 17/534,443, mailed Sep. 11, 2023.
Final Office Action for U.S. Appl. No. 16/930,247 mailed Oct. 12, 2023.
Notice of Allowance for U.S. Appl. No. 17/534,443 mailed Oct. 24, 2023.
International Search Report and Written Opinion for PCT/US2022/013026, mailed Sep. 21, 2022.
Notice of Allowance for U.S. Appl. No. 18/126,935, mailed Jan. 10, 2024.
Notice of Allowance for U.S. Appl. No. 18/215,126, mailed Jan. 25, 2024.

(56)          References Cited

OTHER PUBLICATIONS

Advisory Action and After Final Pilot Decision for U.S. Appl. No. 17/160,080, mailed Jan. 29, 2024.

Non-Final Office Action for U.S. Appl. No. 17/160,082, mailed Feb. 15, 2024.

Final Office Action for U.S. Appl. No. 17/206,029, mailed Feb. 28, 2024.

Non-Final Office Action for U.S. Appl. No. 17/160,080, mailed Mar. 13, 2024.

Non-Final Office Action for U.S. Appl. No. 17/160,084, mailed Mar. 15, 2024.

Non-Final Office Action for U.S. Appl. No. 18/094,305, mailed May 9, 2024.

Final Office Action for U.S. Appl. No. 17/160,084, mailed May 16, 2024.

Non-Final Office Action for U.S. Appl. No. 18/218,009, mailed May 20, 2024.

Final Office Action for U.S. Appl. No. 17/160,080, mailed Jun. 12, 2024.

Notice of Allowance for U.S. Appl. No. 17/389,300, mailed Jun. 27, 2024.

Non-Final Office Action for U.S. Appl. No. 17/160,082, mailed Jul. 24, 2024.

Final Office Action for U.S. Appl. No. 18/094,305, mailed Jul. 29, 2024.

Notice of Allowance for U.S. Appl. No. 16/458,138, mailed Sep. 16, 2024.

Notice of Allowance for U.S. Appl. No. 17/160,082, mailed Sep. 18, 2024.

Notice of Allowance for U.S. Appl. No. 17/537,466, mailed Sep. 25, 2024.

Non-Final Office Action for U.S. Appl. No. 17/988,660, mailed Sep. 25, 2024.

Non-Final Office Action for U.S. Appl. No. 17/160,080, mailed Oct. 16, 2024.

Notice of Allowance for U.S. Appl. No. 18/218,009, mailed Oct. 23, 2024.

Final Office Action for U.S. Appl. No. 18/103,331, mailed Nov. 1, 2024.

Non-Final Office Action for U.S. Appl. No. 16/398,532, mailed Nov. 15, 2024.

Notice of Allowance for U.S. Appl. No. 18/218,009, mailed Nov. 19, 2024.

Non-Final Office Action for U.S. Appl. No. 17/160,084, mailed Dec. 18, 2024.

Non-Final Office Action for U.S. Appl. No. 17/139,842, mailed Dec. 19, 2024.

Non-Final Office Action for U.S. Appl. No. 17/537,468, mailed Jan. 3, 2025.

Final Office Action for U.S. Appl. No. 17/988,660, mailed Jan. 15, 2025.

Notice of Allowance for U.S. Appl. No. 17/988,660, mailed Feb. 26, 2025.

Non-Final Office Action for U.S. Appl. No. 18/082,567 mailed Mar. 22, 2025.

Final Office Action for U.S. Appl. No. 17/557,741 mailed Mar. 27, 2025.

Final Office Action for U.S. Appl. No. 17/160,080 mailed Apr. 7, 2025.

Final Office Action for U.S. Appl. No. 17/160,084 mailed Apr. 23, 2025.

Final Office Action for U.S. Appl. No. 17/537,468, mailed Jun. 11, 2025.

Notice of Allowance for U.S. Appl. No. 17/139,842, mailed Jun. 17, 2025.

Non-Final Office Action for U.S. Appl. No. 18/377,806, mailed Jul. 31, 2025.

Non-Final Office Action for U.S. Appl. No. 17/828,021, mailed Sep. 4, 2025.

Non-Final Office Action for U.S. Appl. No. 18/381,042, mailed Sep. 24, 2025.

* cited by examiner

280

282

```
{
        "FileName": "0196_Purchase_0196-09172019-
195210.pdf_1.png"
        "Fingerprint-Properties": [
            {
                    "Invoice Due Date": [
                            0.59,
                            0.08
                    ]
            }
            {
                    "Shipper ID Number": [
                            0.78,
                            0.12
                    ]
            }
            {
                    "Tracking Number": [
                            0.53,
                            0.31
                    ]
            }
            {
                    "Ship Via": [
                            0.34,
                            0.31
                    ]
            }
            {
                    "Old Customer Number": [
                            0.21,
                            0.08
                    ]
            }
```

```
{
        "FileName": "0196_Purchase_0196-09172019-
195210.pdf_1.png"
        "Fingerprint-Properties": [
                {
                        "Invoice Due Date": [
                                0.59,
                                0.08
                        ]
                }
                {
                        "Shipper ID Number": [
                                0.78,
                                0.12
                        ]
                }
                {
                        "Tracking Number": [
                                0.53,
                                0.31
                        ]
                }
                {
                        "Ship Via": [
                                0.34,
                                0.31
                        ]
                }
                {
                        "Old Customer Number": [
                                0.21,
                                0.08
                        ]
                }
```

```
{
        "FileName": "1872_Purchase_1872-08092019-159095.pdf_1.png"
        "Fingerprint-Properties": [
                {
                        "Date Shipped": [
                                0.04,
                                0.32
                        ]
                }
                {
                        "Tracking Number": [
                                0.54,
                                0.32
                        ]
                }
                {
                        "Shipper ID Number": [
                                0.79,
                                0.12
                        ]
                }
                {
                        "Invoice Due Date": [
                                0.6,
                                0.09
                        ]
                }
                {
                        "Sale Order Number": [
                                0.41,
                                0.12
                        ]
                }
```

```
{
        "id": "a2f7ecbb-e4d7-4fb7-bbe9-ce3f191a598d",
        "pageNum": 1,
        "domainFieldKey": "Invoice No.",
        "blockType": "NO_OBJECT",
        "blockGeometry": {
                "x1": 0.1855,
                "y1": 0.0764,
                "x2": 0.289,
                "y2": 0.0855,
        },
        "blockText": "654321-1",
        "blockKeyText": "",
        "validatedKeyText": "",
        "validatedOcrText": "654321-1",
        "validatedValueText": "654321-1",
        "validatedValueGeometry": {
                "x1": 0.1855,
                "y1": 0.0764,
                "x2": 0.289,
                "y2": 0.0855,
        },
        "validatedOcrBlocktype": "ALL_WORDS",
        "keyValueOrientation": "SINGLE_LINE",
        "totalNumLineBlocks": 1,
        "totalNumVerticalLines": 1,
        "extractionErrorType": "MISSING_COMPLETE",
        "firstLineText": "#########-#",
        "keyValueAnchor": {
                "text": "VAT and ICA",
                "blockType": "KEY_VAL_BLOCK",
                "geometry": {
                        "x1": 0.6753,
                        "y1": 0.0591,
                        "x2": 0.782,
                        "y2": 0.0582,
                }
        }
}
```

```json
{
    "id": "6a44ad0e-55b4-4196-aeff-3b23ca06a325",
    "pageNum": 1,
    "domainFieldKey": "invoice_date",
    "blockType": "KEY_VAL_BLOCK",
    "blockGeometry": {
        "x1": 0.5068,
        "y1": 0.8226,
        "x2": 0.5824,
        "y2": 0.8641
    },
    "blockText": "Document Date 01/24/23",
    "blockKeyText": "Document Date",
    "validatedKeyText": "",
    "validatedOcrText": "01/24/23",
    "validatedValueText": "01/24/23",
    "validatedValueGeometry": {
        "x1": 0.5479,
        "y1": 0.85,
        "x2": 0.5798,
        "y2": 0.8613
    },
    "validatedOcrBlocktype": "ALL_WORDS",
    "keyValueOrientation": "SINGLE_LINE",
    "totalNumLineBlocks": 1,
    "totalNumVerticalLines": 1,
    "extractionErrorType": "MIS_CLASSIFIED_COMPLETE",
    "firstLineText": "###.##",
    "keyValueAnchor": {
        "text": "VAT Amount ###.##",
        "blockType": "KEY_VAL_BLOCK",
        "geometry": {
            "x1": 0.7201,
            "y1": 0.823,
            "x2": 0.7919,
            "y2": 0.8645
        }
    }
}
```

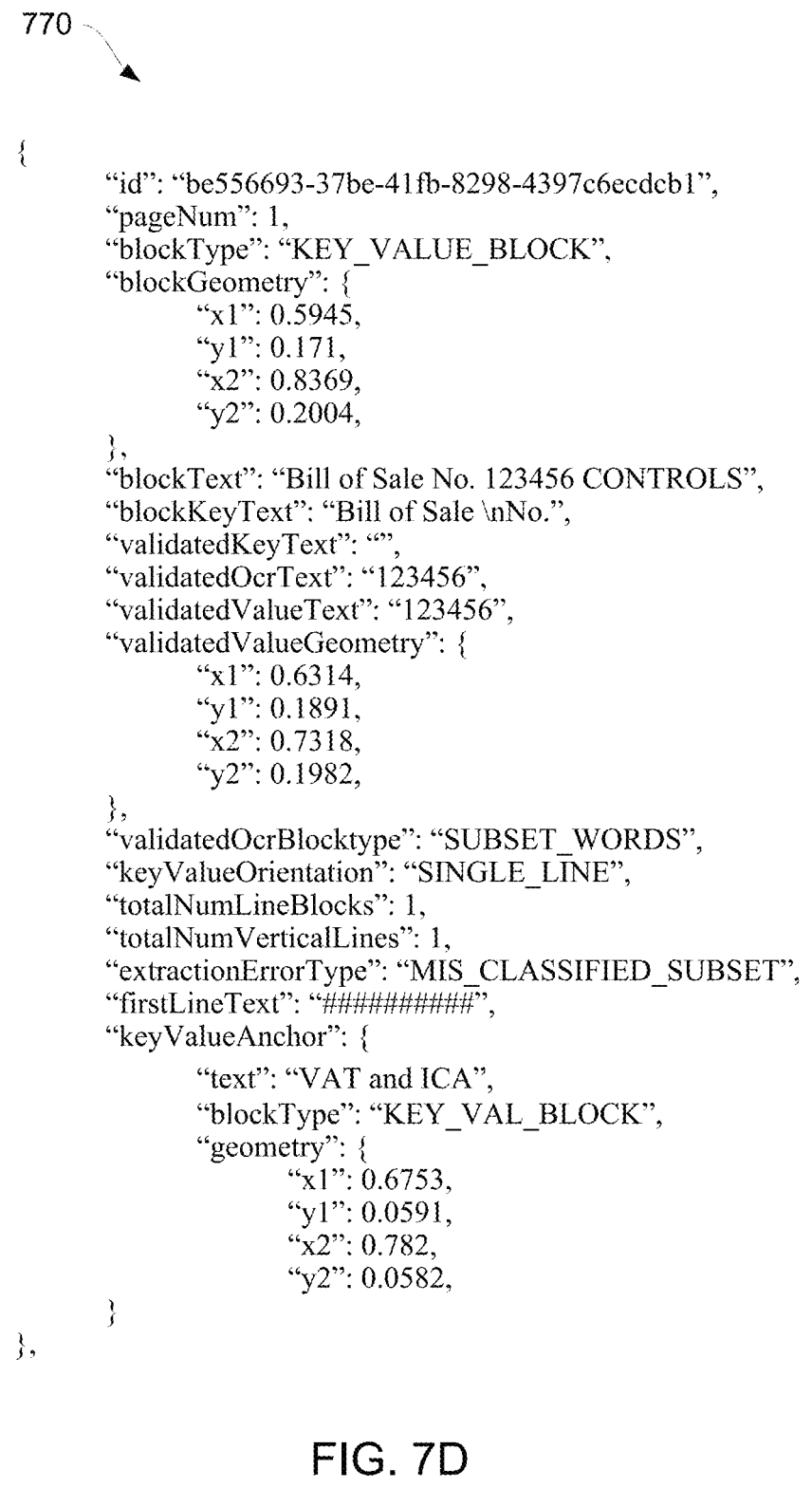

```
{
        "id": "be556693-37be-41fb-8298-4397c6ecdcb1",
        "pageNum": 1,
        "blockType": "KEY_VALUE_BLOCK",
        "blockGeometry": {
                "x1": 0.5945,
                "y1": 0.171,
                "x2": 0.8369,
                "y2": 0.2004,
        },
        "blockText": "Bill of Sale No. 123456 CONTROLS",
        "blockKeyText": "Bill of Sale \nNo.",
        "validatedKeyText": "",
        "validatedOcrText": "123456",
        "validatedValueText": "123456",
        "validatedValueGeometry": {
                "x1": 0.6314,
                "y1": 0.1891,
                "x2": 0.7318,
                "y2": 0.1982,
        },
        "validatedOcrBlocktype": "SUBSET_WORDS",
        "keyValueOrientation": "SINGLE_LINE",
        "totalNumLineBlocks": 1,
        "totalNumVerticalLines": 1,
        "extractionErrorType": "MIS_CLASSIFIED_SUBSET",
        "firstLineText": "###########",
        "keyValueAnchor": {
                "text": "VAT and ICA",
                "blockType": "KEY_VAL_BLOCK",
                "geometry": {
                        "x1": 0.6753,
                        "y1": 0.0591,
                        "x2": 0.782,
                        "y2": 0.0582,
                }
        }
},
```

FIG. 7D

METHOD AND SYSTEM FOR EXTRACTING DATA FROM DOCUMENTS AND AUTOMATICALLY MODIFYING DATA ITEM OF THE EXTRACTED DATA BASED ON GUIDANCE RETRIEVED FROM FEEDBACK FILE

RELATED APPLICATION

This application claims priority to U.S. Provisional Application No. 63/417,296, filed Oct. 18, 2022, and entitled "METHOD AND SYSTEM FOR ENHANCED DATA EXTRACTION FROM IMAGES," which is hereby incorporated herein by reference in its entirety.

BACKGROUND OF THE INVENTION

Today, software can be used to extract data from documents and then operate on the data extracted from documents so as to automate processing of such documents. In such cases, software-driven systems first acquire data extracted from the documents. The data extraction can, for example, use Optical Character Recognition (OCR) techniques as well as machine learning models to intelligently extract text and values from documents. Unfortunately, however, given the wide range of document formats, content, complexity and image quality, data extraction often needs user guidance to resolve ambiguities. Therefore, there remains a need for improved approaches to extract data from documents with minimized ambiguities to better enable automation by software-driven systems with reduced user participation.

SUMMARY

Embodiments disclosed herein concern improved techniques for extraction of data from documents, namely, from images of documents, so as to enable better software automation. The software automation can, for example, be provided by software robots of RPA systems. The improved techniques can provide automated feedback-based modification of data extracted from an image of a document using previously used validation guidance provided by a user in validating extracted data from the same or similar document. In one embodiment, the automated feedback-based modification can locate an appropriate feedback file through use of document fingerprints and document clusters. Then, guidance from the appropriate feedback file can be obtained to automatically enhance at least a portion of the data extracted from the image based on the guidance retrieved from the feedback file. The enhancement being provided can pertain to modification of at least a portion of the data extracted, and the modification can be implemented as a correction, alteration or replacement of at least a portion of the data extracted. Advantageously, the improved techniques can reduce the need for user participation in validation of data extracted from images of documents, and yield greater and more accurate data extraction.

The invention can be implemented in numerous ways, including as a method, system, device, or apparatus (including computer readable medium and graphical user interface). Several exemplary embodiments of the invention are discussed below.

As a computer-implemented process automation system for extracting data from one or more documents, one embodiment can, for example, include at least: a data extraction module configured to use artificial intelligence or machine learning to extract data from an image of a document; and an automated feedback-based modification module configured to process the extracted data to modify at least one data item within the extracted data, with the at least one data item of the extracted data being modified in an automated manner based on a feedback file suitable for use with the document. In one embodiment, the automated feedback-based modification module can be configured to at least: determine a document fingerprint for the document; determine the feedback file that is suitable for use with the document based on the document fingerprint; retrieve guidance from the feedback file for at least one data item of the extracted data being modified; and automatically modify the at least one data item of the extracted data being modified based on the guidance retrieved from the feedback file. Optionally, the computer-implemented process automation system can also include a user validation module and/or a feedback management module configured to update the feedback file based on user validation input received via the user validation module.

As a computer-implemented method for enhancing extracted data from an image of a document, one embodiment can, for example, include at least: determining a document fingerprint for the document; identifying a feedback file that is suitable for use with the document based on the document fingerprint; retrieving guidance from the identified feedback file pertaining to at least one data item of the extracted data being evaluated; and enhancing the at least one data item of the extracted data being evaluated based on the validation guidance retrieved from the identified feedback file.

As a non-transitory computer readable medium including at least computer program code stored thereon for correcting extracted data from an image of a document, one embodiment can, for example, include at least: computer program code for determining a document fingerprint for the document; computer program code for identifying a feedback file that is suitable for use with the document based on the document fingerprint; computer program code for retrieving guidance from the identified feedback file for at least one data item of the extracted data being evaluated; and computer program code for updating the at least one data item of the extracted data being evaluated based on the validation guidance retrieved from the identified feedback file.

As a computer-implemented method for extracting data from an image of a document, one embodiment can, for example, include at least: extracting a plurality of data items from an image of a document; receiving user input concerning a user validation of at least one of the data items of the extracted data from the document; forming or updating a feedback file for the document, the feedback file including validation guidance suitable for use in enhancing the extracted data from the image; and storing the feedback file for subsequent use in use in extracting data from the same or similar documents.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like elements, and in which:

FIG. 2D illustrates an exemplary fingerprint according to one embodiment.

FIGS. 3B and 3C illustrate exemplary fingerprints that can be compared to evaluate whether a pair of fingerprints match according to one embodiment.

FIG. 7B illustrates a portion of an exemplary feedback file according to one embodiment.

FIG. 7C illustrates a portion of an exemplary feedback file according to another embodiment.

FIG. 7D illustrates a portion of an exemplary feedback file according to another embodiment.

DETAILED DESCRIPTION OF CERTAIN EMBODIMENTS

Figure 1:
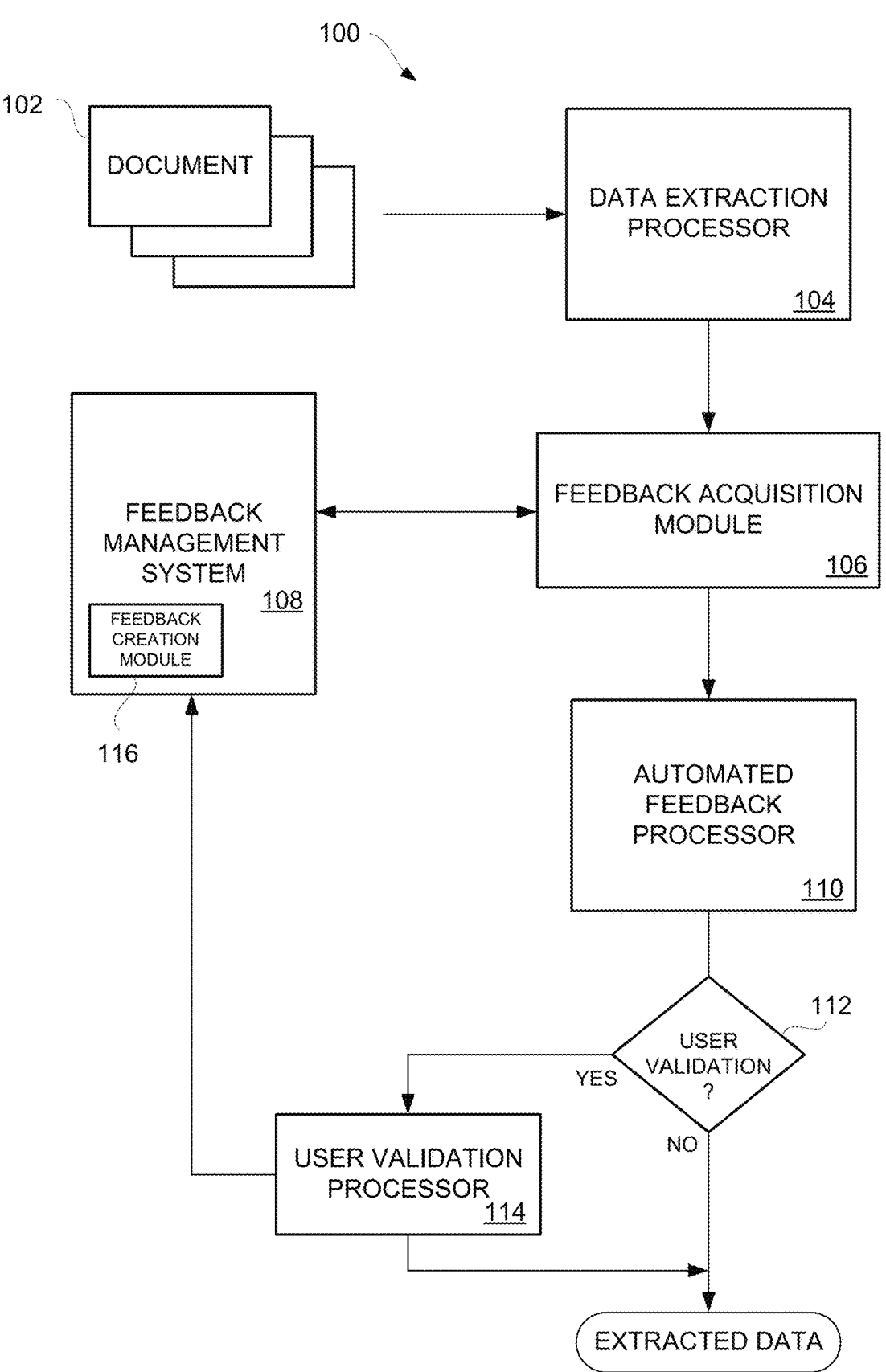
FIG. 1 is a block diagram of a document data extraction system according to one embodiment.

Embodiments disclosed herein concern improved techniques for extraction of data from documents, namely, from images of documents. In some implementations, these techniques can enable better software automation, such as by software robots of RPA systems. The improved techniques can provide automated feedback-based modification of data extracted from an image of a document using previously obtained validation guidance provided by a user in validating extracted data from the same or similar document. In one embodiment, the automated feedback-based modification can determine a document fingerprint for the document, identify a feedback file, that is suitable for use with the document based on the document fingerprint, such as by finding a document cluster which corresponds to the document fingerprint. Then the automated feedback-based modification can retrieve guidance from the feedback file and automatically enhance at least a portion of the data extracted from the image based on the guidance retrieved from the feedback file. The enhancement being provided can pertain to modification of at least a portion of the data extracted. The modification can be implemented as an addition of data, or as a correction, alteration or replacement of at least a portion of the data extracted. Advantageously, the improved techniques can reduce the need for user participation in validation of data extracted from images of documents and yield greater and more accurate data extraction.

Generally speaking, software-driven systems, such as RPA systems, use computer software to emulate and integrate the actions of a user interacting within digital systems. In an enterprise environment, these RPA systems are often designed to execute a business process. In some cases, the RPA systems use Artificial Intelligence (AI) and/or other machine learning capabilities to handle high-volume, repeatable tasks that previously required people to perform. The RPA systems support a plurality of software robots. More specifically, the RPA systems can provide for creation, configuration, management, execution, monitoring, and/or performance of software robots.

Software robots can also be referred to as robotic agents, software agents, or bots. A software robot can interpret and execute tasks on one's behalf. Software robots are particularly well suited for handling a lot of the repetitive tasks that people perform every day. Software robots can perform a task they are tasked with and do it consistently and reliably each time. As one example, a software automation process can locate and read data in a document, email, file, or user interface (e.g., window). As another example, a software robot can connect with one or more Enterprise Resource Planning (ERP), Customer Relations Management (CRM), core banking, and other business systems to distribute data where it needs to be in whatever format is necessary. In still another example, a software robot can perform data tasks, such as reformatting, extracting, balancing, error checking, moving, copying, and the like. In yet another example, a software robot can recognize and obtain data desired from a document, webpage, application, screen, file, image, or other data source. In still another example, a software robot can be triggered based on time or an event, and can serve to take files or data sets and move them to another location, whether it is to a customer, vendor, application, department, or storage.

The various aspects disclosed herein can be utilized with or by robotic process automation systems. Exemplary robotic process automation systems and operations thereof are detailed below.

Embodiments of various aspects of the invention are discussed below with reference to FIGS. 1-12. However, those skilled in the art will readily appreciate that the detailed description given herein with respect to these figures is for explanatory purposes as the invention extends beyond these limited embodiments.

FIG. 1 is a block diagram of a document data extraction system 100 according to one embodiment. The document data extraction system 100 operates to extract data from images of documents 102. The documents 102 are provided to a data extraction processor 104. The data extraction processor 104 can utilize various extraction technologies including optical character recognition (OCR), Natural Language Processing (NLP), and Artificial Intelligence (AI) or machine learning models. The data extraction processor 104 processes an image for a given document of the documents 102 to extract data items recognized within the image. As extracted, the data items (e.g., data objects) being recognized can include key-value pairs, text objects and/or graphic objects. Additionally, for the various data items, geographic position of the various data items with respect to the document can also be obtained by the data extraction processing.

Although data extraction is generally accurate, data extraction often has ambiguities or difficulties extracting certain data from images of documents, such as when the images are corrupted, defective or otherwise not clear. Difficulties can also occur when the documents are complex. In any case, following data extraction, user validation can be performed. User validation solicits user assistance so that the data extraction can be assisted by the user, such that at least some of the ambiguities of the data extraction can be resolved.

The document data extraction system 100 also includes a feedback acquisition module 106. The feedback acquisition module 106 can be utilized after the data extraction has been performed by the data extraction processor 104. Here, the feedback acquisition module 106 operates to search a feedback management system 108 for a feedback file that contains feedback that has been derived from user validations that were previously performed. In one implementation, feedback can be determined from prior user validation(s) for the same or similar documents.

The feedback within the feedback file can be utilized by the automated feedback processor 110 to understand how to resolve certain ambiguities with respect to the data extraction provided by the data extraction processor 104. If an appropriate feedback file has been found by the feedback management system 108, the identified feedback file can be provided to the feedback acquisition module 106. Following the feedback acquisition, assuming a feedback file has been found, the automated feedback processor 110 can utilize the identified feedback file to perform one or more automated modifications to the data that has been extracted by the data extraction processor 104. As a result, the automated feedback processor 110 is oftentimes able to resolve one or more of the certain ambiguities with respect to the data extraction performed by the data extraction processor 104.

After the automated feedback processor 110 has performed its operations for one or more automated modifications to resolve one or more of the certain ambiguities, a decision 112 can determine whether user validation is needed. User validation may be needed when there remains one or more ambiguities with respect to the data extraction provided by the data extraction processor 104. Hence, when the decision 112 determines that user validation is required, user validation is supported by a user validation processor 114. The user validation processor 114 can interact with a user to obtain validation information that can be utilized to resolve any of the remaining one or more ambiguities with respect to the data extraction. The user validation can request and receive user input that can be provided to the data extraction processor 104 so that certain ambiguities with respect to the data extraction can be resolved.

On the other hand, when the decision 112 determines a user validation is not needed, then user validation by the user validation processor 114 can be bypassed. Following the user validation by the user validation processor 114 when user validation is provided as well as following the decision 112 when no user validation is provided, the document data extraction system 100 has completed its data extraction.

Additionally, after the user validation has been performed via the user validation processor 114, the user validation processor 114 can also provide validation data to the feedback management system 108. The feedback management system 108, in response to the validation data, can update the feedback file that is associated with the document undergoing the data extraction. The feedback management system 108 can include a feedback creation module 116. The feedback creation module 116 can create a new feedback file or can modify an existing feedback file, such as in response to the validation data.

When a user operates to validate extracted data from a document, the user typically identifies data, such as an object (e.g., form field), within the document that is to be validated, and identifies a proper location for the object within the document. For example, a user can make use of a graphical user interface (e.g., provided by the user validation processor 114) that displays a document with extracted data items visually denoted, and also displays key-value pairs found in the extracted data. The user can select a field to be validated, e.g., by drawing a bounding box around an area that includes or should include data that requires user validation. In some instances, a user selects a field or key for which the automatically extracted value or data was incorrectly extracted or for which the automation extraction process was not able to identify any value or data. Then the user is given the ability to enter a value or a corrected value for the data, or to identify within the document where the value or the correct value is actually located. In some implementations, the user may draw a bounding box, e.g., by using a lasso tool, around the correct value. The document data extraction system 100 then updates the extracted data to reflect the corrected data, or user-validated data, which becomes the new value for the corresponding key of a key-value pair. After such user validations, the feedback creation module 116 can use the information gathered during the user validations to create or update a feedback file for use by other like documents. In one embodiment, a feedback file can include data that is descriptive of objects within one or more documents obtained by data extraction and/or data descriptive of the user validations performed for certain of extracted data from one or more documents.

Figure 2A:
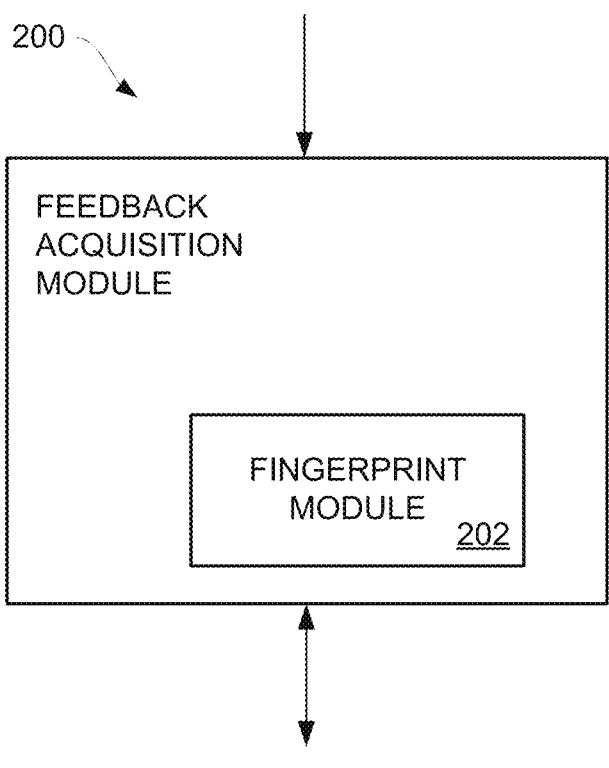
FIG. 2A is a block diagram of a feedback acquisition module according to one embodiment.

FIG. 2A is a block diagram of a feedback acquisition module 200 according to one embodiment. The feedback acquisition module 200 can, for example, be suitable for use as the feedback acquisition module 106 illustrated in FIG. 1. The feedback acquisition module 200 can include a fingerprint module 202. The fingerprint module 202 can produce a fingerprint for a document undergoing data extraction, such as the document 102 illustrated in FIG. 1. An example of a fingerprint that can be produced by the fingerprint module 202 is described below with reference to FIG. 2D.

Figure 2B:
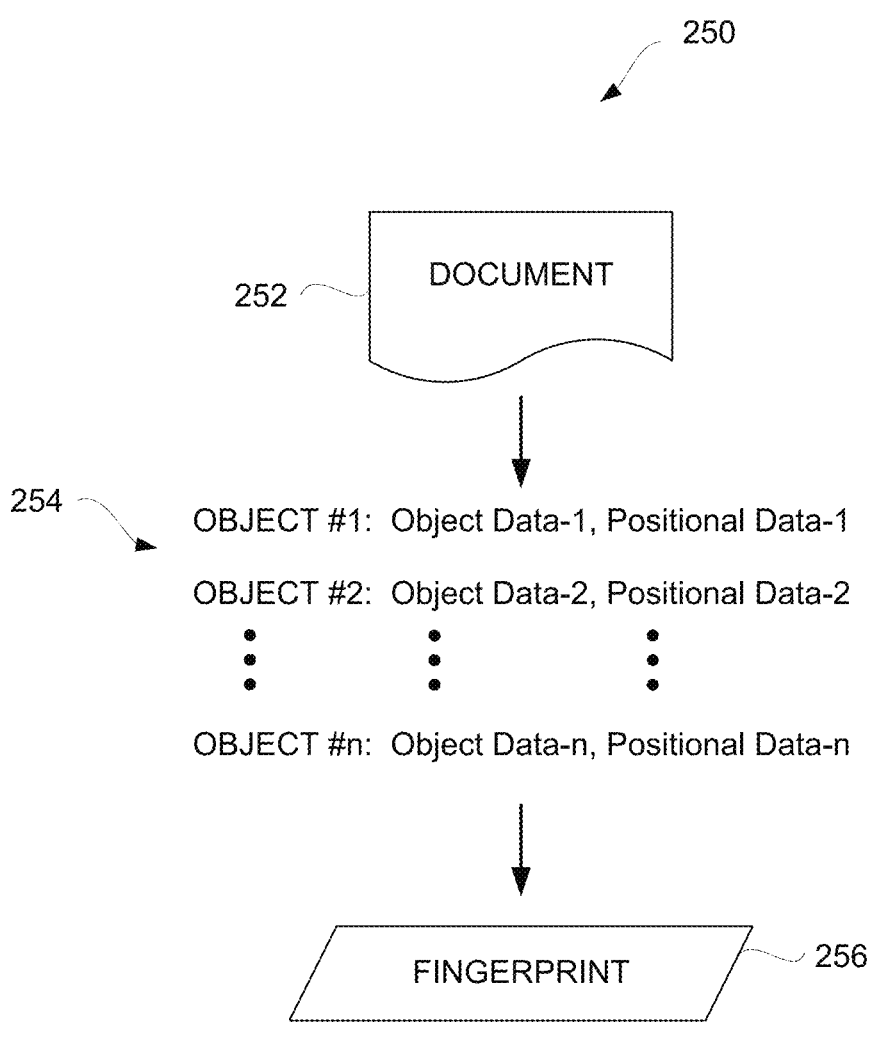
FIG. 2B is a data flow diagram of a fingerprint creation process according to one embodiment.

FIG. 2B is a data flow diagram of a fingerprint creation process 250 according to one embodiment. The fingerprint creation process 250 can, for example, be performed by the fingerprint module 202 illustrated in FIG. 2A.

The fingerprint generation process 250 can receive a document image 252 for a document. The document can be a paper document or an electronic document. The document image 252 can then undergo data extraction in which objects 254 can be extracted from the document image 252. The objects 254 can include object data, such as key-value pairs, text, or graphics. Additionally, the object data can include positional data, which can be provided with the object data that has been extracted. For a given object 254, the positional data can provide a position of the object relative to the associated document. For example, data extraction can identify a bounding box for an object, and the position of the bounding box can be identified. In one implementation, the position of a bounding box can be denoted as x and y pixel coordinates. After the data extraction has yielded the objects 254 and their object data, the fingerprint creation process 250 can create a fingerprint 256 for the document image 252. The fingerprint 256 can be created from the object data for each object of a set of the objects 254. For example, the set of objects can include n objects, #1-#n, with each object 254 including at least object data (e.g., a key or a key-value pair) and positional data (x, y position). In one embodiment, the object data of each of the objects of the set of objects 254 can be collectively used to generate a corresponding fingerprint.256. Another example of a fingerprint that is generated based on object information is shown in FIG. 2D.

Additionally, if desired, the resulting fingerprint 256 can be converted into a compact digital value (though still a fingerprint) by providing the object data as inputs into a hash function, wherein the generated hash value (or hash string) represents the fingerprint 256 in a compact digital format. Other techniques as known in the art can also be used to generate fingerprints from the object data.

Figure 2C:
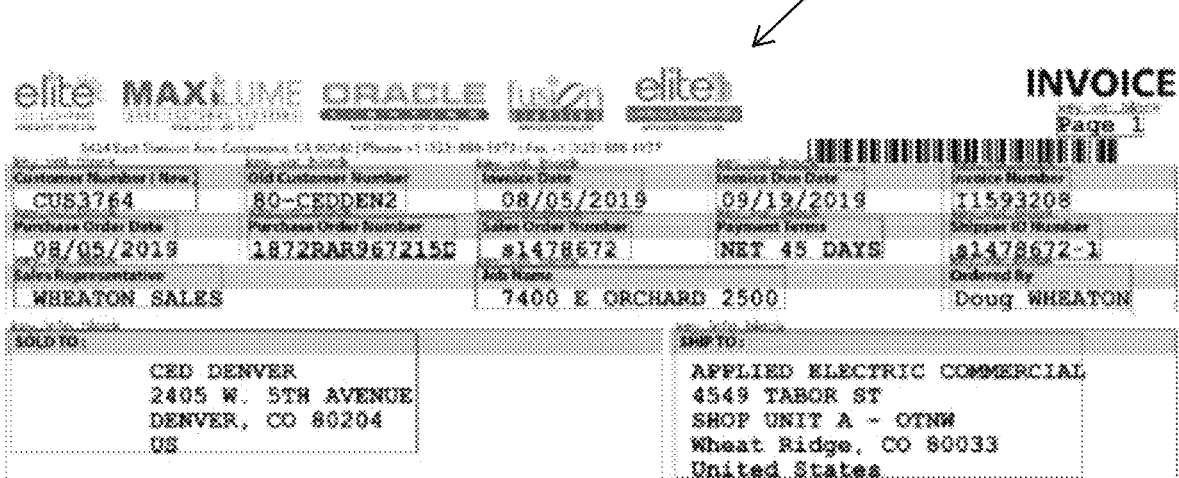
FIG. 2C is a view of an exemplary image of a document having objects detected therein visually denoted.

FIG. 2C is a view of an exemplary image 270 of a document having objects detected therein visually denoted. These objects are often key-value pairs. In this example, the detected objects include various keys, such as: Customer Number/New, Old Customer Number, Invoice Date, Invoice Due Date, Invoice Number, Purchase Order Date, Purchase Order Number, Sales Order Number, Payment Terms, Shipper ID Number, Sales Representative, Job Name, Ordered By, Sold To, and Ship To, as exemplary keys. Each of these detected keys has a corresponding value, as noted in the Table I below.

TABLE I

| Key | Value |
| --- | --- |
| Customer Number/New | CUS3764 |
| Old Customer Number | 80-CDDDEN2 |
| Invoice Date | Aug. 5, 2019 |
| Invoice Due Date | Sep. 19, 2019 |
| Invoice Number | I1593208 |
| Purchase Order Date | Aug. 5, 2019 |
| Purchase Order Number | 1872RAR967215D |
| Sales Order Number | s1478672 |
| Payment Terms | NET 45 DAYS |
| Shipper ID Number | s1478672-1 |
| Sales Representative | WHEATON SALES |
| Job Name | 7400 E. Orchard 2500 |
| Ordered By | Doug WHEATON |
| Sold To | CED DENVER |
| | 2405 W. 5TH AVENUE |
| | DENVER, CO 80204 |
| | US |
| Ship To | APPLIED ELECTRICAL COMMERCIAL |
| | 4549 TABOR ST |
| | SHOP UNIT A - OTNW |
| | Wheat Ridge, CO 80033 |
| | United States |

In a simplified example, a document fingerprint can be based on a set of keys and their positional information. In one example, the set of keys used to create a document fingerprint can include: Invoice Due Date, Shipper ID Number, Tracking Number, Ship Via, and Old Customer Number. In such as case, an exemplary fingerprint can be provided as shown in FIG. 2D.

FIG. 2D illustrates an exemplary fingerprint 280 according to one embodiment. The exemplary fingerprint 280 can be stored as a digital file. In one implementation, the digital file for the exemplary fingerprint 280 can have a JavaScript Object Notation (JSON) format. The exemplary fingerprint 280 can have a name (e.g., "filename") 282 which can be a randomly assigned identifier. The exemplary fingerprint 280 can also have fingerprint properties 284. In this example, the fingerprint properties 283 that make up the fingerprint 280 can include a set of objects and their positions. In this example, the objects are "keys" and include Invoice Due Date, Shipper ID Number, Tracking Number, Ship Via, and Old Customer Number. Further, each of the objects has positional data denoting its position. In this example, the positional data is provided for each of the objects (e.g., keys) in the set of objects is shown in Table II below.

TABLE II

| Key | Position (x, y) |
| --- | --- |
| Invoice Due Date | 0.59, 0.08 |
| Shipper ID Number | 0.78, 0.12 |
| Tracking Number | 0.53, 0.31 |
| Ship Via | 0.34, 0.31 |
| Old Customer Number | 0.21, 0.08 |

Figure 3A:
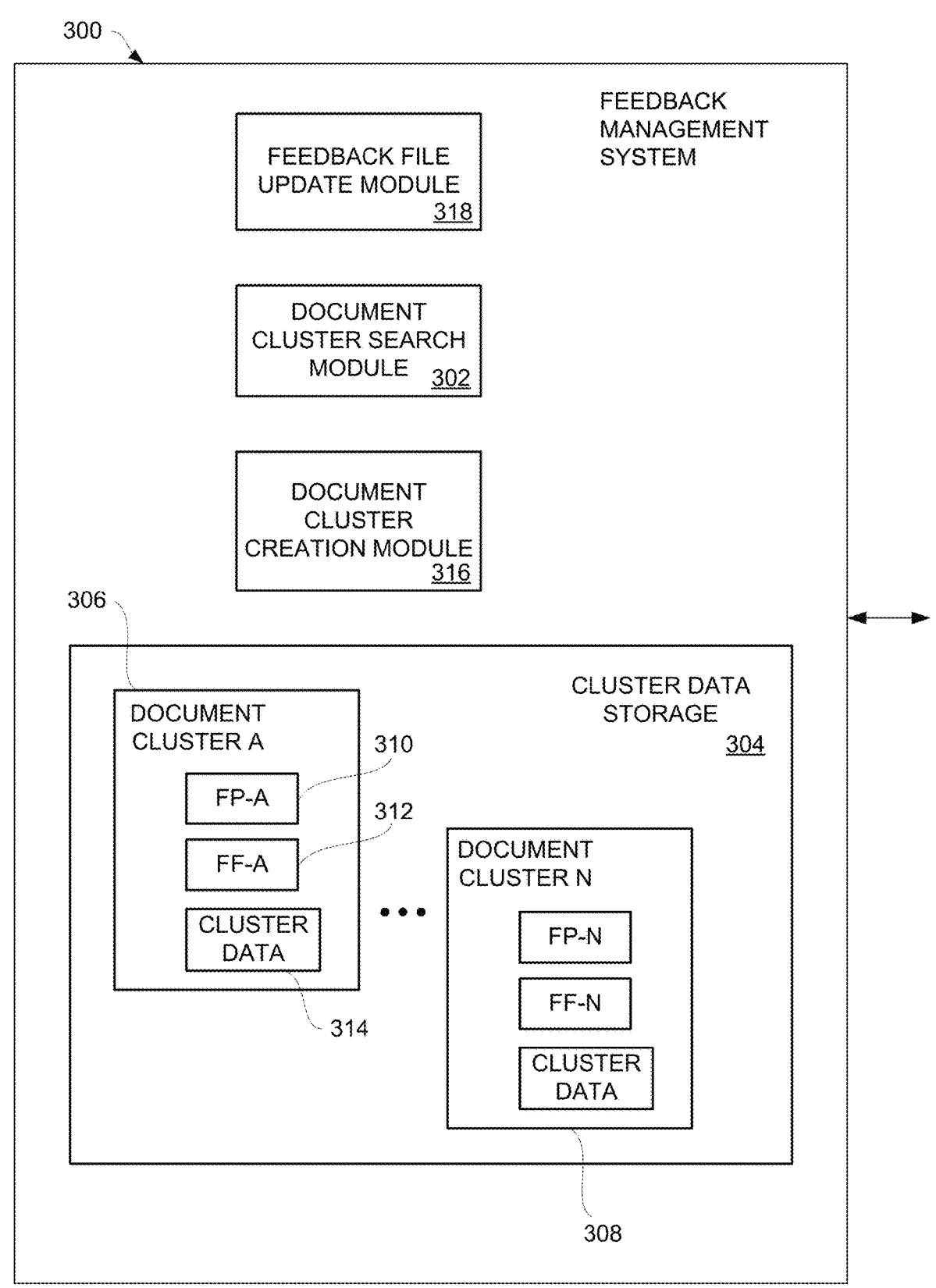
FIG. 3A is a block diagram of a feedback management system according to one embodiment.

FIG. 3A is a block diagram of a feedback management system 300 according to one embodiment. The feedback management system 300 is, for example, suitable for use of the feedback management system 108 illustrated in FIG. 1.

The feedback management system 300 includes a document cluster search module 302 that receives a fingerprint for a document being processed via the fingerprint module 202 of the feedback acquisition module 200. The document cluster search module 302 compares the fingerprint for the document with fingerprints associated with document clusters. A document cluster is a group of substantially similar documents. For example, each of the documents associated with a document cluster can have a degree of similarity in terms of having object types and positional locations that are similar or the same. Also, the degree of similarity to determine whether documents should be associated with a particular document cluster can be set depending on how similar or distinct each document cluster is desired to be relative to other document clusters, how many total document clusters are desired, and other design factors.

The feedback management system 300 can include (or couple to) a cluster data storage 304. As illustrated in FIG. 3A, the document cluster storage 304 includes a plurality of clusters, including cluster A 306 through cluster N 308. Each of the stored clusters can have a fingerprint, a feedback file, and cluster data. In particular, the document cluster A 306, as stored in the document cluster storage 304, can include a fingerprint (FP-A) 310, a feedback file (FF-A) 312, and cluster data 314. Likewise, the other stored document clusters can include a fingerprint, a feedback file, and cluster data. The document cluster search module 302 can compare the fingerprint for the document with fingerprints associated with document clusters, such as the fingerprint (FP-A) 310 for the document cluster A 306.

In one embodiment, the comparison of respective fingerprints can be done by calculating a text similarity score (e.g., for the objects, such as keys, associated with the fingerprints) and then a graph similarity score (e.g., for the positions) using Euclidean distance between a node (e.g., for each object's bounding box/block) and one or more reference positions. The one or more reference positions can be relative to a document reference position (e.g., 0,0) or to anchor objects within the document's image. An aggregate score of the one or more Euclidean distances can be calculated and if two fingerprints have individual or aggregate scores within a set of one or more thresholds, then a matching cluster can be considered found, provided that the text similarity score is matching or substantially similar.

The cluster data 314 of the document cluster A 306 can also include data pertaining to the corresponding cluster. For example, the cluster data 314 can include data pertaining to each of the documents that correspond to the particular cluster.

The feedback management system 300 can also include a document cluster creation module 316 and a feedback file update module 318. The document cluster creation module 316 can be used to create a new document cluster when a document being processed does not correspond to any existing document clusters. In doing so, the document cluster creation module 316 can assign a fingerprint (FP) to the new document cluster. In some situations, where a user or developer desires, the document cluster creation module 316 may partition an existing document cluster into two separate document clusters so that different feedback files can be associated with the two new separate document clusters. This may be advantageous when automated feedback-based modification of extracted data is desired for two types of documents that were treated similarly, but for which the user would like to start treating differently. The feedback file update module 318 can be used to update a feedback file for a document cluster. For example, with respect to the document cluster A 306, the feedback file update module 318 can update the feedback file (FF-A) 312. In one implementation, the update to the feedback file for a document cluster can include additional data into the feedback file to detail a user validation that was performed with respect to a document associated with the document cluster.

FIGS. 3B and 3C illustrate exemplary fingerprints that can be compared to evaluate whether a pair of fingerprints match according to one embodiment. The fingerprint comparison can compare a document fingerprint 320 (i.e., a fingerprint for a document) shown in FIG. 3B with one or more cluster fingerprints 322 (i.e., fingerprints for clusters) shown in FIG. 3C. As an example, the comparison can compare fingerprints by comparing the objects and their positions within the documents that make up the respective fingerprints. In doing so, objects of the different fingerprints can be compared by comparing object text (e.g., keys) and positions of objects making up the document fingerprint with object text (e.g., keys) and positions of objects making up the one or more cluster fingerprints. The document fingerprint 320 includes a series of text objects, including "Invoice Due Date", Shipper ID Number", "Tracking Number", "Ship Via", and "Old Customer Number", each having positional coordinates (e.g., x and y values). The cluster fingerprint 322 includes a series of text objects, including "Date Shipped", "Tracking Number", "Shipper ID Number", "Invoice Due Date", and "Sales Order Number", each having positional coordinates (e.g., x and y values). The comparison then can yield the following objects that are considered matching by matching of keys (e.g., text) and positional coordinates (e.g., centroid coordinates) that are within a threshold of exactly matching, see Table III.

TABLE III

| Document Fingerprint Objects | | Cluster Fingerprint Objects |
|---|---|---|
| "Invoice Due Date" Position: (0.59, 0.08) | Match | "Invoice Due Date" Position: (0.6, 0.09) |
| "Tracking Number" Position: (0.53, 0.31) | Match | "Tracking Number" Position: (0.54, 0.32) |
| "Shipper ID Number" Position: (0.78, 0.12) | Match | "Shipper ID Number" Position: (0.79, 0.12) |

The pair of fingerprints having the fingerprint objects noted in Table III can be considered matches because a sufficient number of objects, e.g., text objects, match and their respective positions are close enough to be considered matches. For example, if a predetermined percentage of the objects match one another, then the respective fingerprints can be considered matching.

Generally speaking, various embodiments discussed herein provide or support data extraction of data from an image, such as an image of a document. In some embodiment, processing to carry out data extraction with accuracy and with greater automation can include the acts of creating a feedback file and then later using the feedback file to reduce user interactions needed, e.g., to correct or modify any automatically extracted data, and thus enhance automation of the data extraction. In some implementations, a feedback file can be created by: (i) extracting data from an image of a document; (ii) performing user validation(s) with respect to the extracted data to improve the extracted data, and then (iii) create a feedback file including data descriptive of the user validation(s). In some implementations, a previously created feedback file can be used with data extraction for greater automation, by: (i) extracting data from an image of another document; (ii) identifying a previously created feedback file that is suitable for use with the another document; and (iii) correcting at least a portion of the extracted data in an automated manner using the identified and previously created feedback file without needing user assistance.

Figure 4:
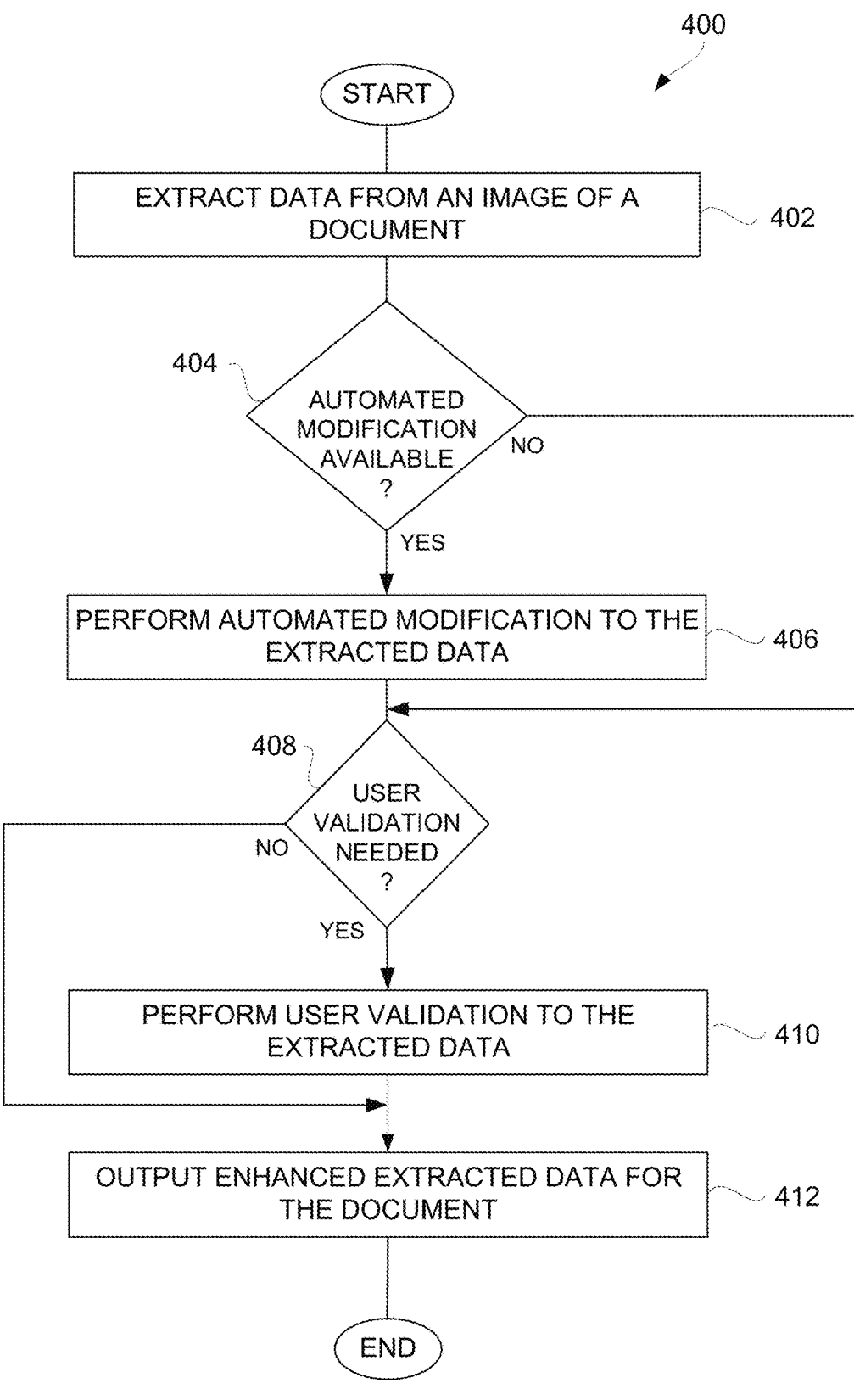
FIG. 4 is a flow diagram of a data extraction process according to one embodiment.

FIG. 4 is a flow diagram of a data extraction process 400 according to one embodiment. The data extraction process 400 can, for example, be performed by one or more computing devices.

The data extraction process 400 can extract 402 data from an image of a document. In some implementations, the extraction 402 involves identifying objects contained within the document images using machine learning models that are pre-trained for document extraction. The extraction 402 may also include extracting key value pairs and the location of each of the pairs. Using this information, an identifier, such as a fingerprint, can be generated for each document.

A decision 404 can then determine whether automated modification is available. When the decision 404 determines that automated modification is available, the data extraction process 400 performs 406 automated modifications to the extracted data. Alternatively, when the decision 404 determines that automated modification is not available, the block 406 is bypassed.

Following the block 406 or following the decision 404 when the block 406 is bypassed, a decision 408 can determine whether user validation is needed. When the decision 408 determines that user validation is needed, then the data extraction process 400 can perform 410 user validation for the extracted data. Alternatively, when the decision 408 determines that user validation is not needed, then the block 410 can be bypassed as user validation need not be performed. In either case, following the block 410 or following the decision 408 when the user validation is not needed and the block 410 is bypassed, enhanced extracted data for the document can be output 412. Following the block 412, the data extraction process 400 can end. It should be understood that block 410 may output the same data as that which was originally extracted in block 402 if both blocks 406 (performing automated modification) and 410 (performing user validation) were bypassed.

Figure 5A:
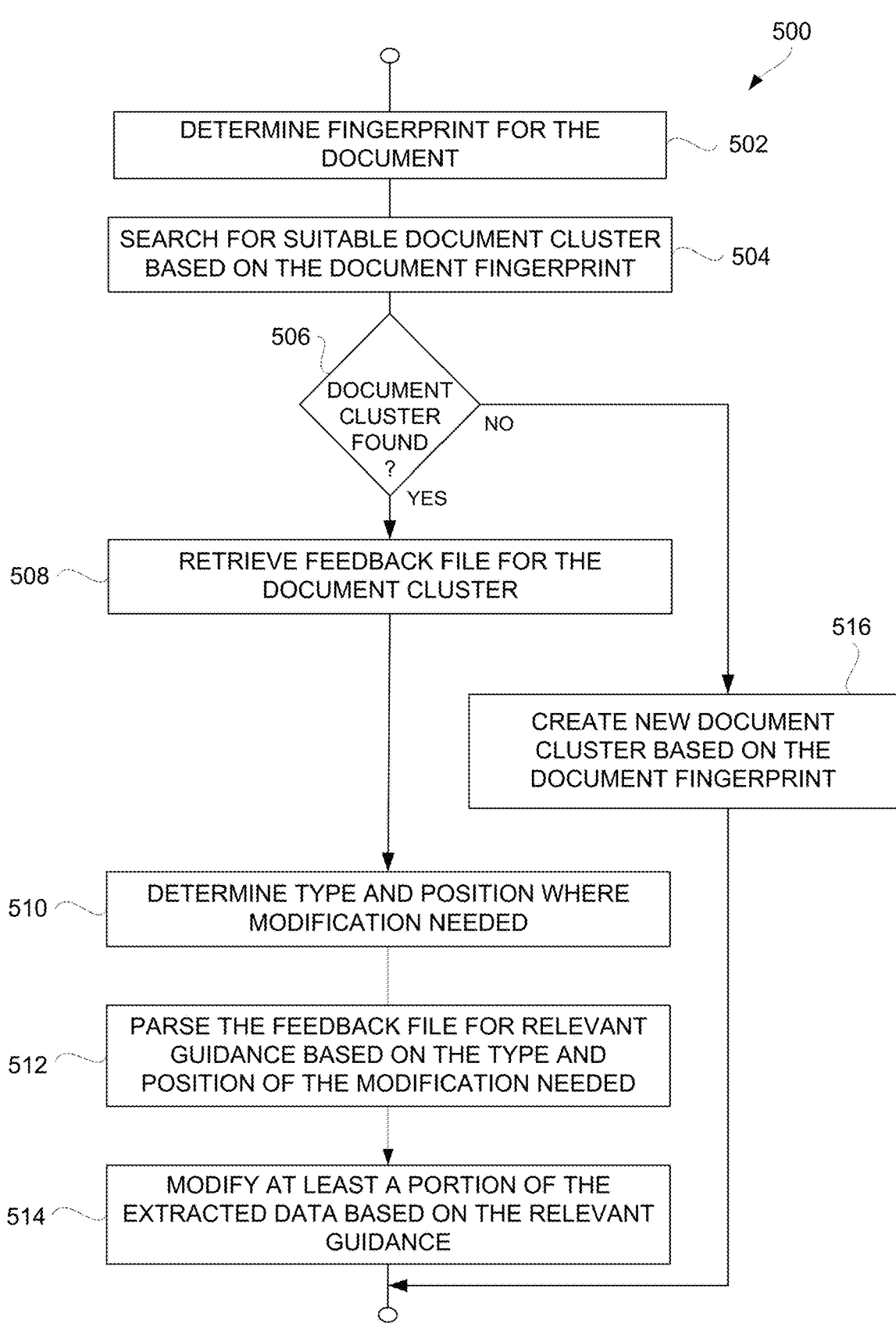
FIG. 5A is a flow diagram of an automated modification process according to one embodiment.

FIG. 5A is a flow diagram of an automated modification process 500 according to one embodiment. The automated modification process 500 is, for example, processing that can be performed by the automated feedback processor 110 illustrated in FIG. 1 or the automated modification to extracted data performed at block 406 in the data extraction process 400.

The automated modification process 500 can generate 502 a fingerprint for a document. In the event that the fingerprint was previously generated and stored for the document, then the fingerprint can simply be retrieved from data storage. Next, the automated modification process 500 can search 504 for a suitable document cluster based on the document fingerprint. A document cluster is a grouping of like documents that can be considered similar such that they can share a feedback file. Each document cluster has its own fingerprint. The search 504 can search through available document clusters for a cluster having a fingerprint that matches with the document fingerprint for the document. An exemplary searching operation is described herein with respect to the document cluster search module 302 illustrated in FIG. 3A.

Following the search 504 for a suitable document cluster, a decision 506 can determine whether a document cluster has been found. When the decision 506 determines that a document cluster has been found, then a feedback file for the document cluster can be retrieved 508. For example, with respect to FIG. 1, the feedback file for the document cluster can be obtained from the feedback management system 108.

After the feedback file for the document cluster has been retrieved 508, the automated modification process 500 can determine 510 a type (e.g., object type) and position where a modification of the extracted data is needed. Next, the automated modification process 500 can parse 512 the feedback file for relevant guidance based on the type and position of the modification needed. Thereafter, at least a portion of the extracted data can be modified 514 based on the relevant guidance. The modification can be performed by reconsideration of the data extraction. For example, in view of information within the feedback file, the reconsideration of the data extraction can be better performed, such as in accordance with a user's prior validation of object type and/or position of object for the same or similar document. After the extracted data has been modified 514, the automated modification process 500 has completed its modification to at least a portion of the extracted data.

On the other hand, when the decision 506 determines that a suitable document cluster has not been found, a new document cluster can be created 516 based on the document fingerprint. Here, a new document cluster is created 516 which is then associated with not only the document presently undergoing processing but also other like documents that are subsequently associated with the new document cluster. As a result, all document associated with a given document cluster can share a common feedback file.

Figure 5B:
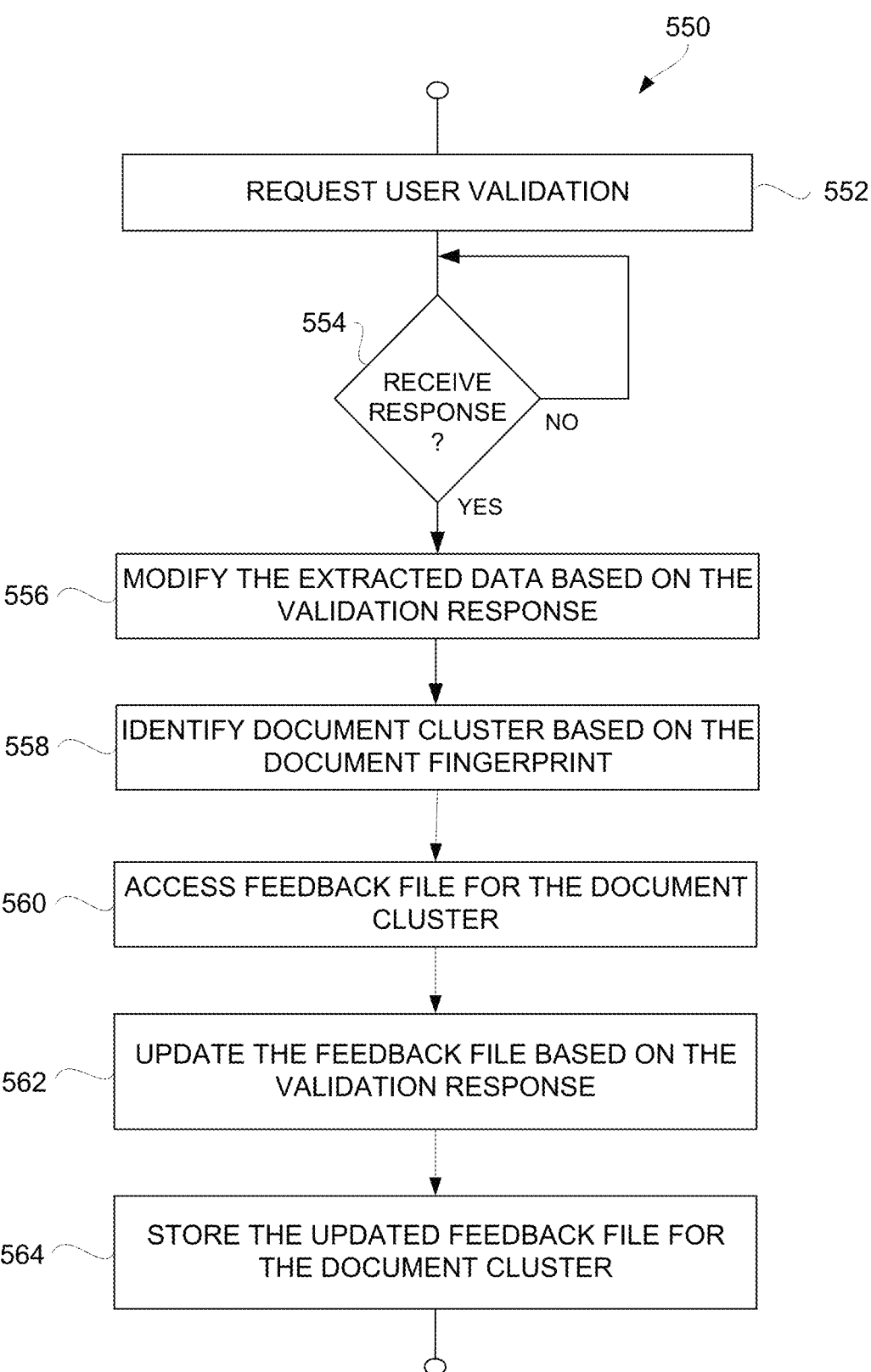
FIG. 5B is a flow diagram of a user validation process according to one embodiment.

FIG. 5B is a flow diagram of a user validation process 550 according to one embodiment. The user validation process 550 is, for example, processing that can be performed by the user validation processor 114 illustrated in FIG. 1 or the processing performed at block 410 in the data extraction process 400 illustrated in FIG. 4.

The user validation process 550 can request a user validation from a user. After the user validation has been requested 552, a decision 554 can determine whether a response has been received. When the decision 554 determines that a response is not yet been received from the user, the user validation process 550 can await such a response.

Alternatively, when the decision 554 determines that a response has been received from the user, additional processing can be performed by the user validation process 550.

In particular, the extracted data can be modified 556 based on the validation response. For example, the extracted data that is undergoing validation can be modified 556 in accordance with the validation response that is been provided by the user.

Next, a document cluster can be identified 558 based on the document fingerprint. The feedback file for the identified document cluster can then be accessed 560. After the feedback file has been accessed, the feedback file can be updated 562 based on the validation response. By updating the feedback file, the feedback file records and recognizes the validation that has been performed by the user for the given document. By doing so, the feedback file stores knowledge concerning the validation that has been performed on the given document so that other documents that are associated with the same document cluster can be potentially subsequently processed in a more knowledgeable manner because the automated modification processing can make use of a more knowledgeable feedback file. As a result, it may be that automated modifications to the extracted data can be performed, such as by the automated modification process 500, so that the user may not need to provide a validation response with respect to the corresponding portion of the extracted data. In any event, following the update 562 to the feedback file, the updated feedback file can be stored 564 for the associated document cluster. Following the block 564, the user validation process 550 can end.

As an examples, FIGS. 7B, 7C and 7D discussed below show examples of feedback files after having been updated based on user validations. Although FIGS. 7B and 7C each detail a single user validation situation, it should be understood that a feedback file can include information from a plurality of different user validations that occur with respect to same or similar documents.

In one embodiment, a feedback file for a document, or cluster of documents, can include data descriptive of objects of the extracted data obtained by data extraction, and data descriptive of the user validations performed for certain of the objects of the extracted data.

The data descriptive of user validations can at least denote name of an object (e.g., field name) that has been validated, and positional coordinates for where its value is located within the document. Additionally, feedback files can contain other descriptive data that can characterize validations that have been performed for the document or cluster of documents. By containing the other descriptive data, the system is better able to utilize feedback or guidance contained in a feedback file to further improve data extractions of same or similar documents. The other descriptive data can, for example, include one or more of: block type, key value orientation, data type, graphic anchor, key value anchor, total line segments, total vertical lines, and extraction error type.

Block type indicates a type of object within which a value is typically contained, such as table, form field, or key value pair. For example, during user validation, when the user draws a bounding box around a detected object, then the type of that object can be denoted as the block type. For example, if a user validated value is within the bounds of a table found within the document, then the block type for the user validation can be denoted as "table". As another example, if a user draws a bounding box around a value to be validated and that value is contained within a form field, then the block type for the validation can be denoted as "form field".

Key value orientation indicates an orientation of a key value pair within the document. If a user validated value is within the bounds of a key value block type, then the orientation of the key and value can be determined. For example, a graph-based test can be performed to determine orientations. Examples of key value orientations include (i) top to bottom, where the key and values are displayed and can be read in a top to bottom orientation, (ii) left to right, where key and values are displayed and can be read in a left to right orientation, (iii) left to right at various angles, etc.

Data type indicates a data type for a validated value. For example, data types for a validated value can include text, numbers, monetary amount, phone number, alphanumeric code, etc. In one embodiment, a Natural Language Processing (NLP) machine learning model can be trained to identify data types of validated values.

Anchors refer to detected objects that provide a positional reference. Graphic anchor(s) refer to detected graphical objects that provide a positional reference. A graphic anchor can, for example, indicate Euclidean distance from centroids of one or more graphical objects (which serve as anchors) found in the document to the validated value. Key value anchor(s) refer to detected key value objects that provide a positional reference. A key value anchor can, for example, indicate Euclidean distance from centroids of one or more other key value objects (which serve as anchors) found in the document to the validated value. The various anchors can provide positional references for an object within a document that can assist locating an object within a document for data extraction.

Total line segments denote a total number of line segments found in the bounding box for the validated value. Total vertical lines denote a total number of line segments found in the bounding box for the validated value that share a unique y-axis position (e.g., are in different single page wide lines).

Extraction error type indicates a type of error that the document data extraction system has made during data extraction. For example, the extraction error type can be missed or misclassified. Missed extraction error types are extraction errors where an extraction system failed to identify or extract certain data, e.g., a key or a value. Misclassified error types are extraction errors where an extraction system identifies an extracted piece of data to be of an incorrect type, e.g., as having an incorrect block type, or where a field type was incorrectly classified, e.g., where a field was improperly classified as purchase order field when it should have been classified as an invoice number field.

Generally, a feedback file that is appropriate for a document can be used to store information that can be used by a data extraction system to better extract data from the document. In doing so, the feedback file can be examined to locate relevant data (e.g., descriptive data of prior validations), and then corrections to data extraction with respect to the document can be made in an automated manner using the relevant data obtained from the feedback file. The relevant data obtained from the feedback file provides guidance as to how the data extraction can be improved, such that enhanced extracted data can be obtained. For example, the initial data extraction may have missed or misclassified an object within the document being examined, but with the guidance offered by the appropriate feedback file, subsequent data extraction for the document can correctly detect the object within the document's image in an automated fashion.

Figure 6A:
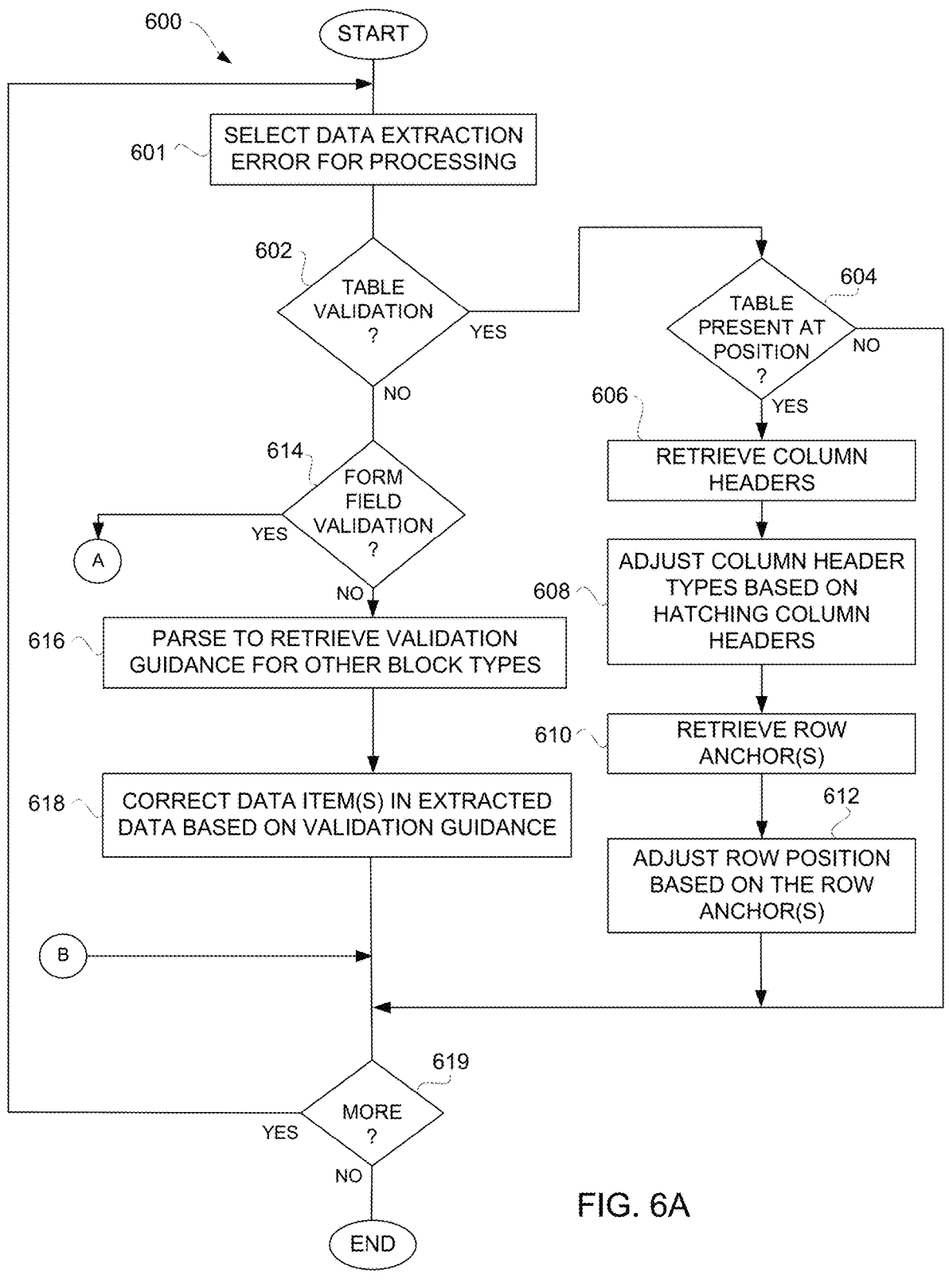
FIGS. 6A and 6B are flow diagrams of a feedback utilization process according to one embodiment.
Figure 6B:
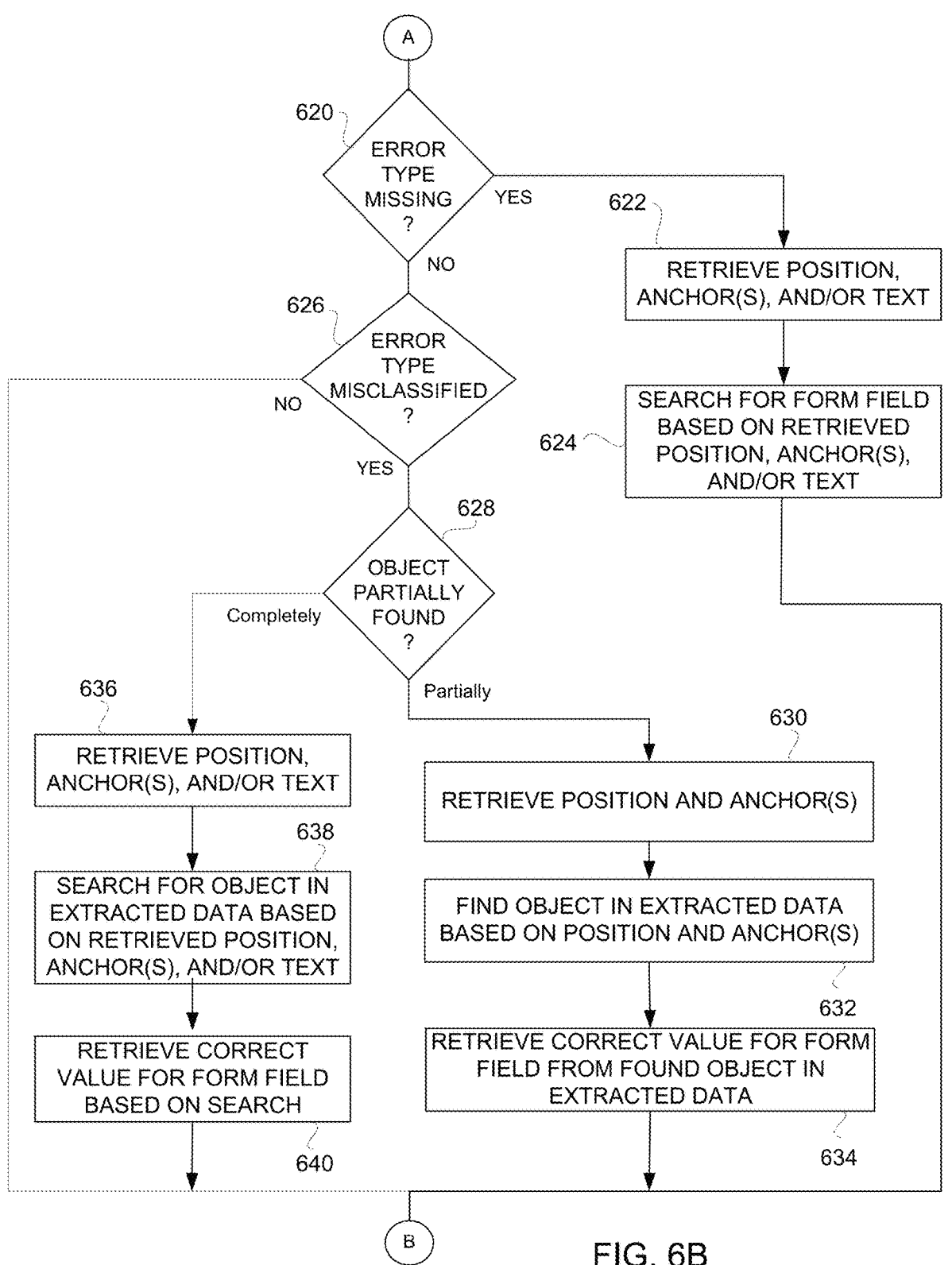

FIGS. 6A and 6B are flow diagrams of a feedback utilization process 600 according to one embodiment. The feedback utilization process 600 is, for example, performed by the automated feedback processor 110 illustrated in FIG. 1.

The feedback utilization process 600 considers data extraction difficulties for various types of objects, which can be distinguished by their block type. For example, the block types can include table blocks, form field blocks, and other block types. Tables block are blocks of data pertaining to table objects identified by the data extraction. Form field blocks are blocks of data pertaining to form fields identified by the data extraction.

The feedback utilization process 600 can initially select 601 a data extraction error from a set of data extractions to be processed for correction. Next, a I decision 602 can determine whether a table validation is needed. When the decision 602 determines a table validation is needed, a decision 604 can determine whether a table was present at the position of the object within the document. When the decision 604 determines that the table is present at the position within the document, column headers can be retrieved 606. Next, column header types can be adjusted 608 based on matching column headers. In addition, one or more row anchors can be retrieved 610 at the position of the object within the document, and then row position of one or more rows within the table can be adjusted 612.

Alternatively, when the decision 604 determines that a table is not present at the position within the document, then blocks 608-612 can be bypassed. Following the block 612, or its being bypassed, a decision 619 can determine whether there are more data extraction errors to be processed. When the decision 619 determines that there are more data extraction errors to be processed, then the feedback utilization process 600 can return to repeat block 601 so that another data extraction error can be selected from the set of data extraction errors and similarly processed. On the other hand, when the decision 619 determines that there are no more data extraction errors to be processed, the feedback utilization process 600 can end.

On the other hand, when the decision 602 determines that table validation is not needed, then a decision 614 can determine whether a form field validation is needed. When the decision 614 determines that a form field validation is not needed, the feedback utilization process 600 can perform other processing on other types of blocks of data within the extracted data. In this regard, the feedback utilization process 600 can parse 616 the feedback file to retrieve validation guidance for other block types. Then, the feedback utilization process 600 can correct 618 one or more data items in the extracted data based on the retrieved validation or feedback guidance. Following the block 618, the feedback utilization process 600 can end.

On the other hand, when the decision 614 determines that form field correction is needed, an error type can be determined. Errors in data extraction can be classified through the data validation process. A form field type of extraction error may be classified as a "missing" type of error when no object (e.g., key value block, information block, etc.) is found in the extracted data. A misclassification type of extraction error occurs when an object (e.g., key value block, information block, etc.) is found in the extracted data but the key or value within the extracted data is incorrectly predicted. An example of a misclassification is where data extraction predicts that an object has a key value pair pertaining to "Ship Date" but in actuality it pertains to "Invoice Date". In the case of misclassification, the key value pair extraction error type can be further classified as either a "subset" or a "complete" error. A "subset" error is when an extracted value is partially correct and partially incorrect. With subset errors, users typically would validate is a portion, or a subset, of the key value detected by the data extraction system as being correct. Alternatively, in the case of mis-classification, if the key value detected for the object is the same (i.e., matches) as the key value that a user validated, then the key value for the object is denoted as "complete".

More particularly, as shown in FIG. 6B, when the decision 614 determines that form field correction is needed, then a decision 620 can determine whether the error type is "missing". As shown in FIG. 6B, when the decision 620 determines that the error type is "missing", then the feedback utilization process 600 can retrieve 622 position, one or more anchors, and/or text from the feedback file that corresponds to where the correct data is located in the document according to previous user validation inputs. Then, the feedback utilization process 600 can search 624 for the document for the correct key or value based on the feedback file information, e.g., the retrieved position, one or more anchors, and/or text.

Alternatively, when the decision 620 determines that the error type is not "missing", then a decision 626 can determine whether the error type is "misclassified". After the decision 626 determines that the error type is "misclassified", then a decision 628 can determine whether the extracted object was completely or partially extracted. In the case in which the object has been partially found (that is, a subset was been found), position and one or more anchors can be retrieved 630. Then, the feedback utilization process 600 can find 632 the complete object in the extracted data based on the position and the one or more anchors. Thereafter, the correct value for the form field of the object can be retrieved 634 from the extracted data pertaining to the complete object.

On the other hand, when the decision 628 determines that the object has not been partially found, that is, the object has been completely found, then the feedback utilization process 600 can retrieve 636 position, one or more anchors, and/or text from the feedback file. Then, the feedback utilization process 600 can search 638 for the object in the extracted data based on the position, one or more anchors, and/or text. Once the object is located, then the correct value for the form field of the object can be retrieved 640 from the extracted data pertaining to the object. Following the blocks 624, 634 and 638, the feedback utilization process 600 can return to block 619 shown in FIG. 6A. The feedback utilization process 600 can also directly proceed to block 619 following the decision 626 when the decision 626 determines that the error type is not "misclassified".

Generally speaking, user validation performed with documents can be captured and stored with additional character-izing data (e.g., location and textual references) into a feedback file. Thereafter, the feedback (more generally, guidance) from prior user validations stored in the associated feedback file can be used to improved data extraction on a subsequent, similar document. These documents can be grouped into document clusters of like documents, and then separate feedback files can be provided for each of the different document clusters.

For example, as shown in FIGS. 6B, when extracting form fields from an image of a document, a decision can initially check whether the initial data validation falls in the "miss-ing" error category or the "misclassified" error category. If the error category is "missing", it is assumed that even for the current document, there is no object detection predic-tions made which encompasses the field of interest. If the error category is "misclassified", the assumption is that even for the current document, an object detection prediction was made which encompasses the field of interest but the field type property is incorrect.

As an example, assume that a user made a specific validation with respect to a previous document, such as denoting that a particular form field is an "Invoice Number" field. Typically, the user would perform the validation by selecting the correct area within the image of the document were the correct value resides. In one implementation, the user would draw a box around the correct value within the image of the document. Thereafter, the document data extraction system can utilize its feedback creation module to create or modify a feedback file so as to record data identifying the error type and all other relevant properties. The relevant properties of the error can be acquired by searching through the OCR results (e.g., recognized text) and detected objects within the document. The data stored to the feedback file can be referred to as feedback or informa-tion that serves to characterize the error. The feedback or information that serves to characterize the error includes at least an error type indication and relevant properties of the error, such as from recognized text and detected objects.

For the form field of this example, the error type can be recognized as "misclassified". This means that there was a detection made encompassing the field but the field type was incorrectly extracted. In this case, "Invoice Number" was incorrectly classified as "PO Number". After the user per-forms the user validation be adding the correct field name and submitting the document, this information (i.e., feed-back) is stored in a feedback file. When a subsequent document which belongs to the same document cluster undergoes data extraction, the feedback file (e.g., for the document cluster) can be accessed and the information stored therein can allow the document data extraction sys-tem to ensure the same error for Invoice Number does not occur again.

Figure 7A:
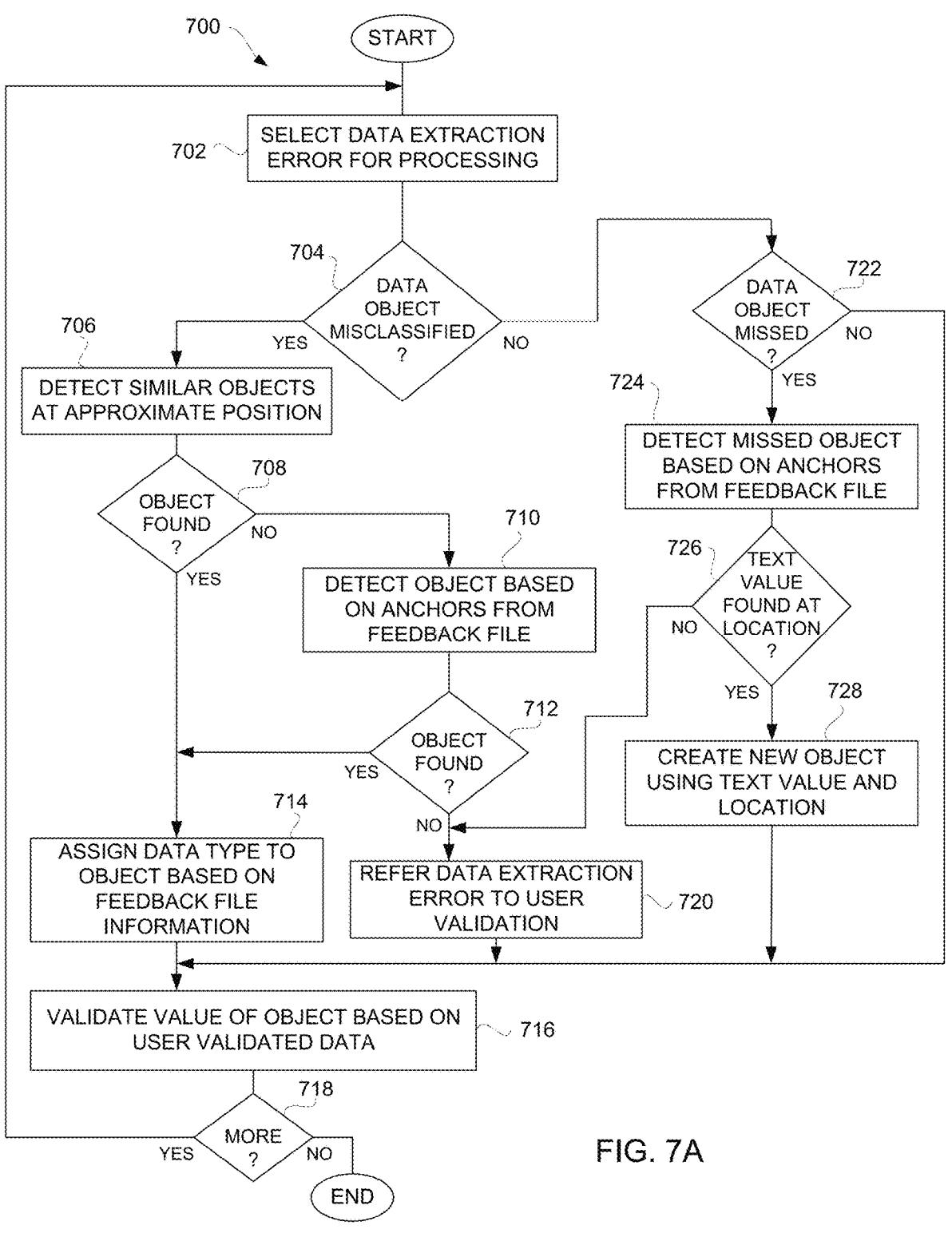
FIG. 7A is a flow diagram of a feedback utilization process according to another embodiment.

FIG. 7A is a flow diagram of a feedback utilization process 7000 according to another embodiment. The feed-back utilization process 700 is, for example, performed by the automated feedback processor 110 illustrated in FIG. 1. The feedback utilization process 700 considers data extrac-tion errors that occur for data objects, and can use automated processing and information from a feedback file to correct the data extraction errors.

The feedback utilization process 700 can occur after data has been extracted from a document using a document extraction process, for example an extraction process that utilizes artificial intelligence, and after a feedback file has been found to correspond the document. The feedback utilization process 700 can be performed for each data extraction error that corresponds to a validated error con-tained in the feedback file. In some implementations, a feedback file might have information relating to a plurality of different validation errors, so the processing shown of the feedback utilization process 700 would be performed mul-tiple times, once for each validated error. The feedback utilization process 7000 results in each data extraction error being corrected based on information obtained from user validation feedback stored in an appropriate feedback file.

In one implementation, the extracted data objects can be classified as either "misclassified" or "missing". A data object can be classified as "missing" when no object (e.g., key value block, information block, etc.) was found in the extracted data. A misclassification type of error can occur when an object (e.g., key value block, information block, etc.) is found in the extracted data but the value was not properly recognized. An example of a misclassification is where data extraction predicts that an object has a key value pertaining to "Ship Date" but in actuality it pertains to "Invoice Date".

The feedback utilization process 700 can use an appropriate feedback file to correct one or more data extraction errors that occurred during extraction of data from a document. may identifying each validated error within the feedback file and then use the user feedback information for each error to correct the corresponding data extraction errors in documents. The feedback utilization process 700 can initially select 702 an data extraction error from the one or more data extraction errors that occurred during extraction of data from the document.

Next, at decision 704, the process determines whether a validated data extraction error is of a type in which a data object has been misclassified. When the decision 704 determines that data extraction error is a misclassified error type, one or more similar objects can be detected 706 within the document at a position in the document that is similar or the same position as the misclassified data object that was validated by a user. Next, a decision 708 can determine whether a similar object has been found during the detection 7-6. When the decision 708 determines that a similar object has not been found, then an object can be detected 710 based on one or more anchors from the associated feedback file. Here, the one or more anchors provide one or more positional points of reference for detection of the object within the document. In some implementations, an anchor is a reference position with a document from which an object associated with the misclassified object may likely be found.

A decision 712 can then determine whether an object has been found based on the detecting 710 using the one or more anchors. For example, an object is extracted from a position relative to the anchor-based position and its data type matches the validated datatype. When the decision 712 determines that an object has been found, then a data type can be assigned 714 to the object based on the feedback file information. For example, if an extraction process incorrectly identified an object type or domain field type as "other", the feedback file information may identify the correct type to be "contact person" and thus replace the type accordingly. Next, the value for the object can be validated 716 based on a user validated value from the feedback file. For example, the user validated value from the feedback file information should match the data type that was assigned 714. Various other validation checks can be performed using information from a feedback file.

Following the block 716, a decision 718 can determine if there are more data validation errors to be processed. If the decision 718 determines that there are more data validation errors to be processed, the feedback utilization process 700 can return to block 701 so that another data extraction error can be selected and similarly processed. On the other hand, when the decision 718 determines that there are no more data validation errors to be processed, then the feedback utilization process 700 can end.

Alternatively, when the decision 712 determines that an object has not been found, the feedback utilization process 700 can refer 720 the data extraction error to user validation, where a user can manually seek to resolve the data extraction error. Following the referral 720 to user validation at clock 716, the feedback utilization process 700 can proceed to decision 718.

On the other hand, when the decision 704 determines that a data object has not been misclassified, then a decision 7220 can determine whether a data object was missed during the data extraction. When the decision 722 determines that the data object was missed during data extraction, a missed object can be detected 724 based on one or more anchors from the feedback file. The one or more anchors provide positional reference(s) to direct data extraction to the correct location within the image for the document. Next, a decision 726 can determine whether a text value has been found at inappropriate location. The appropriate location can be in accordance with the positional references provided by the one or more anchors. When the decision 726 determines that a text value has been found, then a new object can be created 728 using the text value and location. Here, the new object is created since it was previously missed by the initial data extraction. Following the creation 728 of the new object, the value of the new object can be validated 726 based on the user validated value provided within the feedback file. Alternatively, when the decision 726 determines that a text value has not been found at the location, the feedback utilization process 700 can refer 720 the data extraction error to user validation because the ambiguity in the initial data extraction has not been resolved by the user of the feedback file. Following the user validation at block 716, the feedback utilization process 650 can proceed to the decision 718.

FIG. 7B illustrates a portion of an exemplary feedback file 750 according to one embodiment. The exemplary feedback file 750 includes information that represents data or a value, identified by a user during a prior user validation process, that is correctly associated with a key, but which was not identified, or missed, by a document extraction algorithm, process, or service. This information, also called user validation feedback information, also includes information regarding the location of where the user identified data within the document or form. For example, the previously missed object originally denoted blockType as NO_OBJECT, and after user validation occurs the feedback information details the validation that occurred to correct the incomplete or inaccurate data extraction. The feedback information stored in the feedback file 750, for example, includes the user validated position, type, format and/or orientation of a previously missed object. The feedback information can also provide positional references for the previously missed object. Each of the positional references can be an anchor (e.g., a key value pair, such as a text label), which can be detailed as a key value pair and its position. The missing object's position, as validated, can be referenced (directly or indirectly) relative to the anchor's position. In such case, the data extraction can then again be performed to discover the missing object but this time being directed to a correct location within the image of the document which the object should be found. In feedback file 750, "domainFieldKey" identifies the name or text of the key. "Invoice No.", for which the value failed to be identified by a document extraction process. "blockType": "NO_OBJECT", represents that no object was found for this key. "blockText": "654321-1" (though presented as hidden (or masked over) to prevent disclosure of private information), and represents the correct value for the "Invoice No." key that was identified by the user during the validation process. "validatedValueGeometry" represents the location of the validated value.

FIG. 7C illustrates a portion of an exemplary feedback file 760 according to another embodiment. The exemplary feedback file 760 includes feedback information that details a user validation for a previously misclassified object. In this example, the misclassification was that the object detected was found but was misclassified. The feedback information stored in the feedback file 760, for example, includes a validated position, type, format, text, value and/or orientation a previously misclassified object. In this example, there was a misclassification from initial data extraction because the initial data extraction misidentified the "key" of the key-value pair as "ship date". The misidentification can be recognized and corrected because the feedback file 760 denotes that a user previously validated such key-value pair as, for example, a key value pair pertaining to "invoice date". The feedback information can also provide one for positional references for the previously misclassified object. Each of the position references can be an anchor (e.g., a key value pair, such as a text label), which can be detailed as a key value pair and its position. The misclassified object's position, as validated, can also be referenced (directly or indirectly) relative to the anchor's position. In such case, the data extraction can then again be performed to rediscover the data of the misclassified object but this time being directed to a correct location within the image of the document where the complete object should be found. However, in this example, the only error needing correction is the misclassification of the key-value pair. which can be resolved directly using the feedback file 760, if desired.

FIG. 7D illustrates a portion of an exemplary feedback file 770 according to another embodiment. The exemplary feedback file 770 includes feedback information that details a user validation for a previously misclassified object. In this example, the misclassification was that the object detected was only a subset of the action object. The feedback information stored in the feedback file 770, for example, includes a validated position, type, format, text, value and/or orientation a previously misclassified object. In this example, there was a misclassification from initial data extraction and only a subset of the object identified. The misidentification can be recognized and corrected because the feedback file 770 denotes that a user previously validated such key-value pair as being located a a particular position within an image of a document (see "blockGeometry" and "validatedValueGeometry"). The feedback information can also provide one for positional references for the previously misclassified object. Each of the position references can be an anchor (e.g., a key value pair, such as a text label), which can be detailed as a key value pair and its position (e.g., "keyValueAnchor" and its "geometry"). The misclassified object's position, as validated, can be referenced (directly or indirectly) relative to the anchor's position. In such case, the data extraction can then again be performed to rediscover the rest of the misclassified object but this time being directed to a correct location within the image of the document where the complete object should be found.

The various aspects disclosed herein can be utilized with or by RPA systems. Exemplary RPA systems and operations thereof are detailed below.

Figure 8:
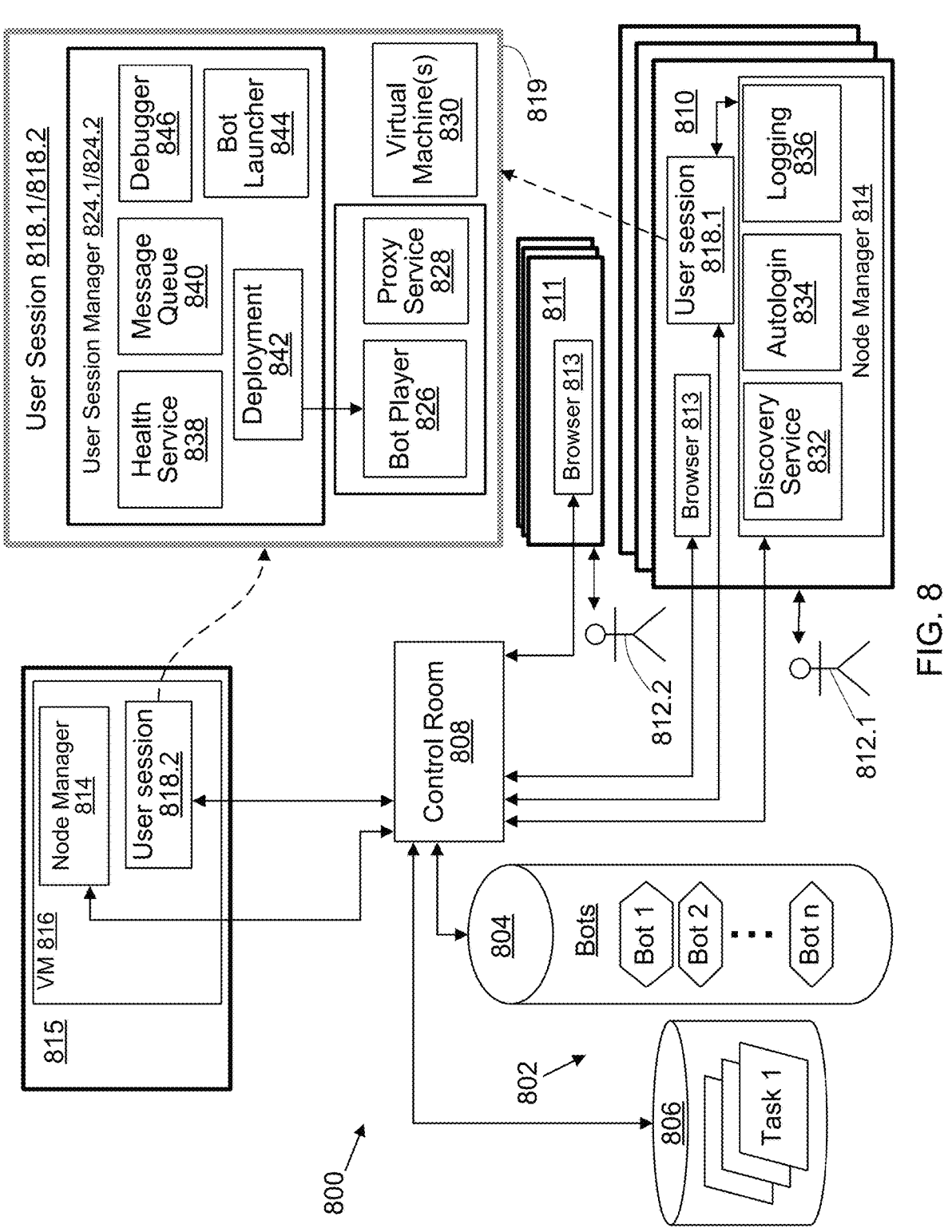
FIG. 8 is a block diagram of an RPA system according to one embodiment.

FIG. 8 is a block diagram of an RPA system 800 according to one embodiment. The RPA system 800 includes data storage 802. The data storage 802 can store a plurality of software robots 804, also referred to as bots (e.g., Bot 1, Bot 2, . . . , Bot n). The software robots 804 can be operable to interact at a user level with one or more user level application programs (not shown). As used herein, the term "bot" is generally synonymous with the term software robot. In certain contexts, as will be apparent to those skilled in the art in view of the present disclosure, the term "bot runner" refers to a device (virtual or physical), having the necessary software capability (such as bot player 826), on which a bot will execute or is executing. The data storage 802 can also stores a plurality of work items 806. Each work item 806 can pertain to processing executed by one or more of the software robots 804.

The RPA system 800 can also include a control room 808. The control room 808 is operatively coupled to the data storage 802 and is configured to execute instructions that, when executed, cause the RPA system 800 to respond to a request from a client device 810 that is issued by a user 812.1. The control room 808 can act as a server to provide to the client device 810 the capability to perform an automation task to process a work item from the plurality of work items 806. The RPA system 800 is able to support multiple client devices 810 concurrently, each of which will have one or more corresponding user session(s) 818, which provides a context. The context can, for example, include security, permissions, audit trails, etc. to define the permissions and roles for bots operating under the user session 818. For example, a bot executing under a user session, cannot access any files or use any applications that the user, under whose credentials the bot is operating, does not have permission to do so. This prevents any inadvertent or malicious acts from a bot under which bot 804 executes.

The control room 808 can provide, to the client device 810, software code to implement a node manager 814. The node manager 814 executes on the client device 810 and provides a user 812 a visual interface via browser 813 to view progress of and to control execution of automation tasks. It should be noted that the node manager 814 can be provided to the client device 810 on demand, when required by the client device 810, to execute a desired automation task. In one embodiment, the node manager 814 may remain on the client device 810 after completion of the requested automation task to avoid the need to download it again. In another embodiment, the node manager 814 may be deleted from the client device 810 after completion of the requested automation task. The node manager 814 can also maintain a connection to the control room 808 to inform the control room 808 that device 810 is available for service by the control room 808, irrespective of whether a live user session 818 exists. When executing a bot 804, the node manager 814 can impersonate the user 812 by employing credentials associated with the user 812.

The control room 808 initiates, on the client device 810, a user session 818 (seen as a specific instantiation 818.1) to perform the automation task. The control room 808 retrieves the set of task processing instructions 804 that correspond to the work item 806. The task processing instructions 804 that correspond to the work item 806 can execute under control of the user session 818.1, on the client device 810. The node manager 814 can provide update data indicative of status of processing of the work item to the control room 808. The control room 808 can terminate the user session 818.1 upon completion of processing of the work item 806. The user session 818.1 is shown in further detail at 819, where an instance 824.1 of user session manager 824 is seen along with a bot player 826, proxy service 828, and one or more virtual machine(s) 830, such as a virtual machine that runs Java® or Python®. The user session manager 824 provides a generic user session context within which a bot 804 executes.

The bots 804 execute on a player, via a computing device, to perform the functions encoded by the bot. Some or all of the bots 804 may in certain embodiments be located remotely from the control room 808. Moreover, the devices 810 and 811, which may be conventional computing devices, such as for example, personal computers, server computers, laptops, tablets and other portable computing devices, may also be located remotely from the control room 808. The devices 810 and 811 may also take the form of virtual computing devices. The bots 804 and the work items 806 are shown in separate containers for purposes of illustration but they may be stored in separate or the same device(s), or across multiple devices. The control room 808 can perform user management functions, source control of the bots 804, along with providing a dashboard that provides analytics and results of the bots 804, performs license management of software required by the bots 804 and manages overall execution and management of scripts, clients, roles, credentials, security, etc. The major functions performed by the control room 808 can include: (i) a dashboard that provides a summary of registered/active users, tasks status, repository details, number of clients connected, number of scripts passed or failed recently, tasks that are scheduled to be executed and those that are in progress; (ii) user/role management—permits creation of different roles, such as bot creator, bot runner, admin, and custom roles, and activation, deactivation and modification of roles; (iii) repository management—to manage all scripts, tasks, workflows and reports etc.; (iv) operations management—permits checking status of tasks in progress and history of all tasks, and permits the administrator to stop/start execution of bots currently executing; (v) audit trail—logs creation of all actions performed in the control room; (vi) task scheduler— permits scheduling tasks which need to be executed on different clients at any particular time; (vii) credential management— permits password management; and (viii) security: management— permits rights management for all user roles. The control room 808 is shown generally for simplicity of explanation. Multiple instances of the control room 808 may be employed where large numbers of bots are deployed to provide for scalability of the RPA system 800.

In the event that a device, such as device 811 (e.g., operated by user 812.2) does not satisfy the minimum processing capability to run a node manager 814, the control room 808 can make use of another device, such as device 815, that has the requisite capability. In such case, a node manager 814 within a Virtual Machine (VM), seen as VM 816, can be resident on the device 815. The node manager 814 operating on the device 815 can communicate with browser 813 on device 811. This approach permits RPA system 800 to operate with devices that may have lower processing capability, such as older laptops, desktops, and portable/mobile devices such as tablets and mobile phones. In certain embodiments the browser 813 may take the form of a mobile application stored on the device 811. The control room 808 can establish a user session 818.2 for the user 812.2 while interacting with the control room 808 and the corresponding user session 818.2 operates as described above for user session 818.1 with user session manager 824 operating on device 810 as discussed above.

In certain embodiments, the user session manager 824 provides five functions. First is a health service 838 that maintains and provides a detailed logging of bot execution including monitoring memory and CPU usage by the bot and other parameters such as number of file handles employed. The bots 804 can employ the health service 838 as a resource to pass logging information to the control room 808. Execution of the bot is separately monitored by the user session manager 824 to track memory, CPU, and other system information. The second function provided by the user session manager 824 is a message queue 840 for exchange of data between bots executed within the same user session 818. The third function is a deployment service (also referred to as a deployment module) 842 that connects to the control room 808 to request execution of a requested bot 804. The deployment service 842 can also ensure that the environment is ready for bot execution, such as by making available dependent libraries. The fourth function is a bot launcher 844 which can read metadata associated with a requested bot 804 and launch an appropriate container and begin execution of the requested bot. The fifth function is a debugger service 846 that can be used to debug bot code.

The bot player 826 can execute, or play back, a sequence of instructions encoded in a bot. The sequence of instructions can, for example, be captured by way of a recorder when a human performs those actions, or alternatively the instructions are explicitly coded into the bot. These instructions enable the bot player 826, to perform the same actions as a human would do in their absence. In one implementation, the instructions can compose of a command (action) followed by set of parameters, for example: Open Browser is a command, and a URL would be the parameter for it to launch a web resource. Proxy service 828 can enable integration of external software or applications with the bot to provide specialized services. For example, an externally hosted artificial intelligence system could enable the bot to understand the meaning of a "sentence."

The user 812.1 can interact with node manager 814 via a conventional browser 813 which employs the node manager 814 to communicate with the control room 808. When the user 812.1 logs in from the client device 810 to the control room 808 for the first time, the user 812.1 can be prompted to download and install the node manager 814 on the device 810, if one is not already present. The node manager 814 can establish a web socket connection to the user session manager 824, deployed by the control room 808 that lets the user 812.1 subsequently create, edit, and deploy the bots 804.

Figure 9:
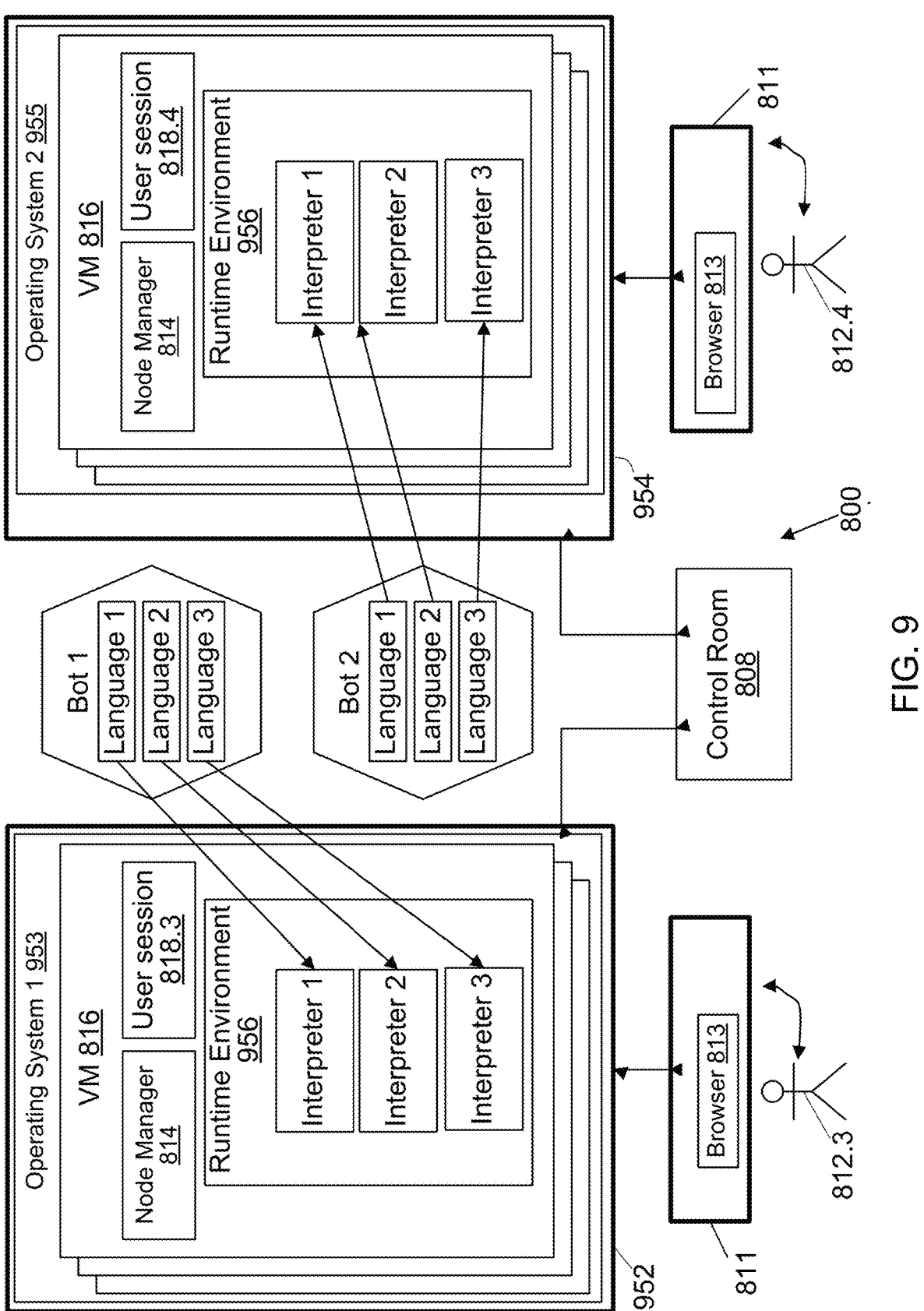
FIG. 9 is a block diagram of a generalized runtime environment for software robots (e.g., bots) in accordance with another embodiment of the RPA system illustrated in FIG. 8.

FIG. 9 is a block diagram of a generalized runtime environment for bots 804 in accordance with another embodiment of the RPA system 800 illustrated in FIG. 8. This flexible runtime environment advantageously permits extensibility of the platform to enable use of various languages in encoding bots. In the embodiment of FIG. 9, RPA system 800 generally operates in the manner described in connection with FIG. 8, except that in the embodiment of FIG. 9, some or all of the user sessions 818 execute within a virtual machine 816. This permits the bots 804 to operate on an RPA system 800 that runs on an operating system different from an operating system on which a bot 804 may have been developed. For example, if a bot 804 is developed on the Windows® operating system, the platform agnostic embodiment shown in FIG. 9 permits the bot 804 to be executed on a device 952 or 954 executing an operating system 953 or 955 different than Windows®, such as, for example, Linux. In one embodiment, the VM 816 takes the form of a Java Virtual Machine (JVM) as provided by Oracle Corporation. As will be understood by those skilled in the art in view of the present disclosure, a JVM enables a computer to run Java® programs as well as programs written in other languages that are also compiled to Java® bytecode.

In the embodiment shown in FIG. 9, multiple devices 952 can execute operating system 1, 953, which may, for example, be a Windows® operating system. Multiple devices 954 can execute operating system 2, 955, which may, for example, be a Linux® operating system. For simplicity of explanation, two different operating systems are shown, by way of example and additional operating systems such as the macOS®, or other operating systems may also be employed on devices 952, 954 or other devices. Each device 952, 954 has installed therein one or more VM's 816, each of which can execute its own operating system (not shown), which may be the same or different than the host operating system 953/955. Each VM 816 has installed, either in advance, or on demand from control room 808, a node manager 814. The embodiment illustrated in FIG. 9 differs from the embodiment shown in FIG. 8 in that the devices 952 and 954 have installed thereon one or more VMs 816 as described above, with each VM 816 having an operating system installed that may or may not be compatible with an operating system required by an automation task. Moreover, each VM has installed thereon a runtime environment 956, each of which has installed thereon one or more interpreters (shown as interpreter 1, interpreter 2, interpreter 3). Three interpreters are shown by way of example but any run time environment 956 may, at any given time, have installed thereupon less than or more than three different interpreters. Each interpreter 956 is specifically encoded to interpret instructions encoded in a particular programming language. For example, interpreter 1 may be encoded to interpret software programs encoded in the Java programming language, seen in FIG. 9 as language 1 in Bot 1 and Bot 2. Interpreter 2 may be encoded to interpret software programs encoded in the Python® programming language, seen in FIG. 9 as language 2 in Bot 1 and Bot 2, and interpreter 3 may be encoded to interpret software programs encoded in the R programming language, seen in FIG. 9 as language 3 in Bot 1 and Bot 2.

Turning to the bots Bot 1 and Bot 2, each bot may contain instructions encoded in one or more programming languages. In the example shown in FIG. 9, each bot can contain instructions in three different programming languages, for example, Java®, Python® and R. This is for purposes of explanation and the embodiment of FIG. 9 may be able to create and execute bots encoded in more or less than three programming languages. The VMs 816 and the runtime environments 956 permit execution of bots encoded in multiple languages, thereby permitting greater flexibility in encoding bots. Moreover, the VMs 816 permit greater flexibility in bot execution. For example, a bot that is encoded with commands that are specific to an operating system, for example, open a file, or that requires an application that runs on a particular operating system, for example, Excel® on Windows®, can be deployed with much greater flexibility. In such a situation, the control room 808 will select a device with a VM 816 that has the Windows® operating system and the Excel® application installed thereon. Licensing fees can also be reduced by serially using a particular device with the required licensed operating system and application(s), instead of having multiple devices with such an operating system and applications, which may be unused for large periods of time.

Figure 10:
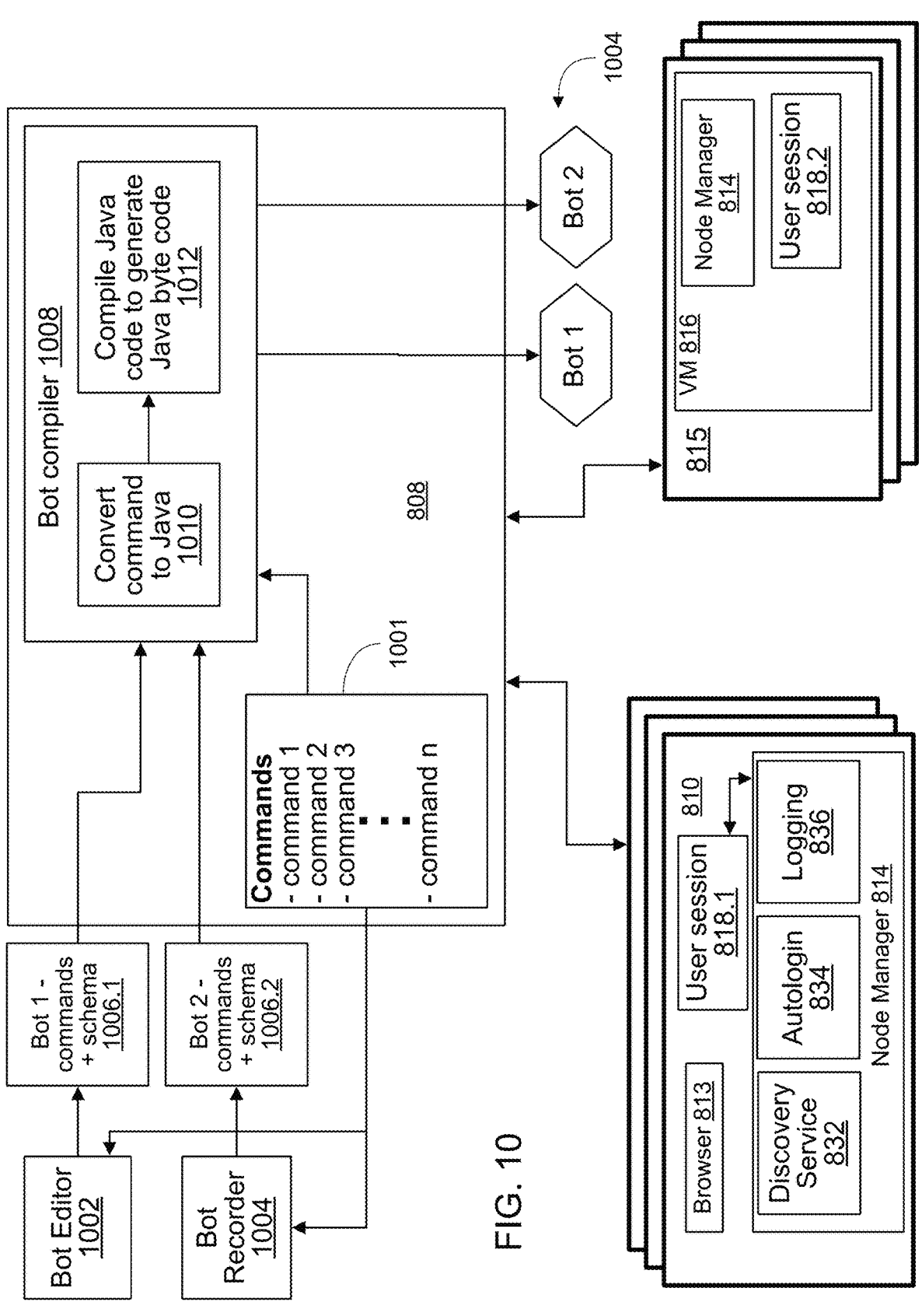
FIG. 10 illustrates yet another embodiment of the RPA system of FIG. 8 configured to provide platform independent sets of task processing instructions for software robots.

FIG. 10 illustrates a block diagram of yet another embodiment of the RPA system 800 of FIG. 8 configured to provide platform independent sets of task processing instructions for bots 804. Two bots 804, bot 1 and bot 2 are shown in FIG. 10. Each of bots 1 and 2 are formed from one or more commands 1001, each of which specifies a user level operation with a specified application program, or a user level operation provided by an operating system. Sets of commands 1006.1 and 1006.2 may be generated by bot editor 1002 and bot recorder 1004, respectively, to define sequences of application-level operations that are normally performed by a human user. The bot editor 1002 may be configured to combine sequences of commands 1001 via an editor. The bot recorder 1004 may be configured to record application-level operations performed by a user and to convert the operations performed by the user to commands 1001. The sets of commands 1006.1 and 1006.2 generated by the editor 1002 and the recorder 1004 can include command(s) and schema for the command(s), where the schema defines the format of the command(s). The format of a command can, such as, includes the input(s) expected by the command and their format. For example, a command to open a URL might include the URL, a user login, and a password to login to an application resident at the designated URL.

The control room 808 operates to compile, via compiler 1008, the sets of commands generated by the editor 1002 or the recorder 1004 into platform independent executables, each of which is also referred to herein as a bot JAR (Java ARchive) that perform application-level operations captured by the bot editor 1002 and the bot recorder 1004. In the embodiment illustrated in FIG. 10, the set of commands 1006, representing a bot file, can be captured in a JSON (JavaScript Object Notation) format which is a lightweight data-interchange text-based format. JSON is based on a subset of the JavaScript Programming Language Standard ECMA-262 3rd Edition—December 1999. JSON is built on two structures: (i) a collection of name/value pairs; in various languages, this is realized as an object, record, struct, dictionary, hash table, keyed list, or associative array, (ii) an ordered list of values which, in most languages, is realized as an array, vector, list, or sequence. Bots 1 and 2 may be executed on devices 810 and/or 815 to perform the encoded application-level operations that are normally performed by a human user.

Figure 11:
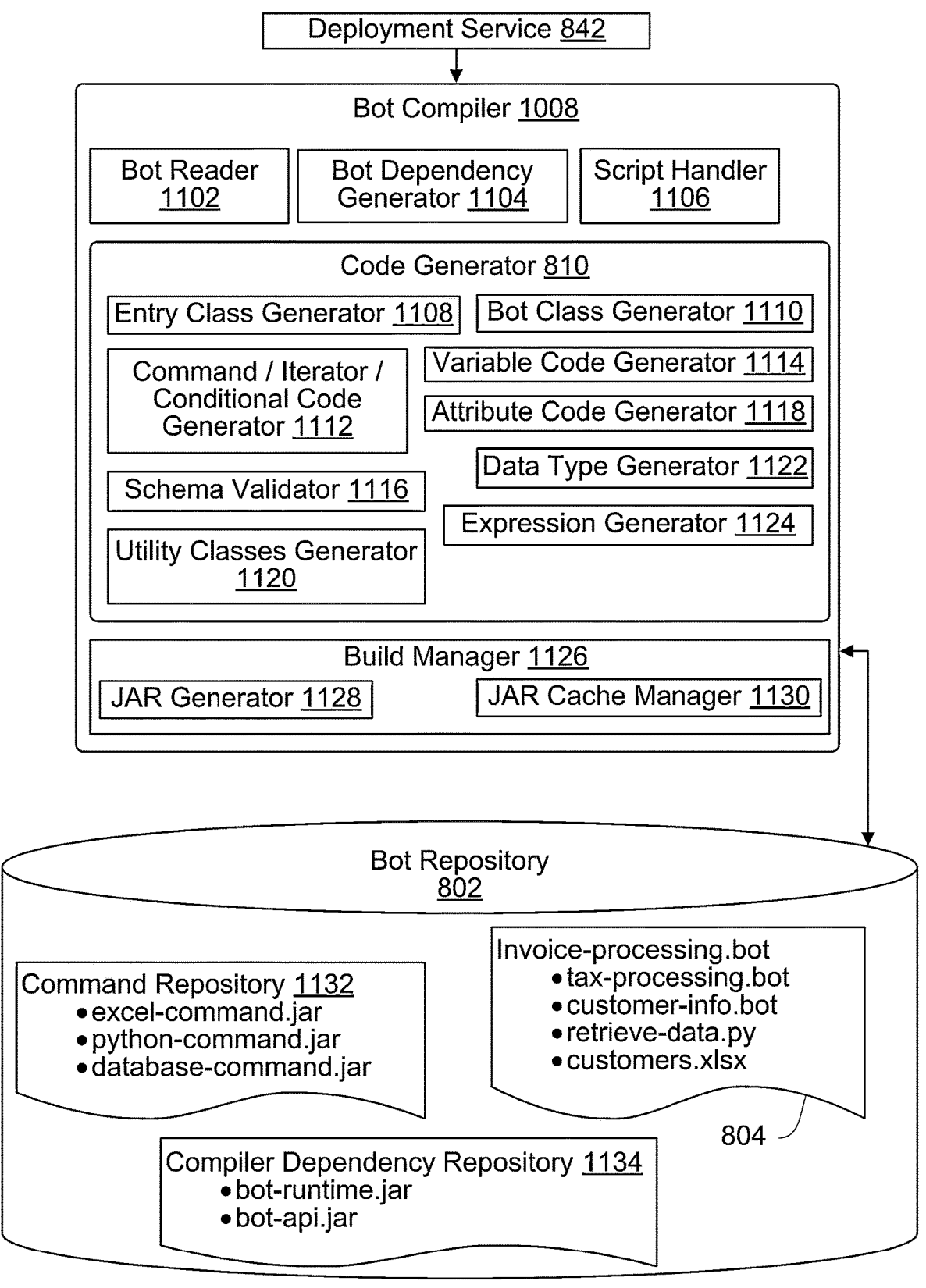
FIG. 11 is a block diagram illustrating details of one embodiment of a bot compiler illustrated in FIG. 10.

FIG. 11 is a block diagram illustrating details of one embodiment of the bot compiler 1008 illustrated in FIG. 10. The bot compiler 1008 accesses one or more of the bots 804 from the data storage 802, which can serve as bot repository, along with commands 1001 that are contained in a command repository 1132. The bot compiler 808 can also access compiler dependency repository 1134. The bot compiler 808 can operate to convert each command 1001 via code generator module 1010 to an operating system independent format, such as a Java command. The bot compiler 808 then compiles each operating system independent format command into byte code, such as Java byte code, to create a bot JAR. The convert command to Java module 1010 is shown in further detail in in FIG. 11 by JAR generator 1128 of a build manager 1126. The compiling to generate Java byte code module 1012 can be provided by the JAR generator 1128. In one embodiment, a conventional Java compiler, such as javac from Oracle Corporation, may be employed to generate the bot JAR (artifacts). As will be appreciated by those skilled in the art, an artifact in a Java environment includes compiled code along with other dependencies and resources required by the compiled code. Such dependencies can include libraries specified in the code and other artifacts. Resources can include web pages, images, descriptor files, other files, directories and archives.

As noted in connection with FIG. 10, deployment service 842 can be responsible to trigger the process of bot compilation and then once a bot has compiled successfully, to execute the resulting bot JAR on selected devices 810 and/or 815. The bot compiler 1008 can comprises a number of functional modules that, when combined, generate a bot 804 in a JAR format. A bot reader 1102 loads a bot file into memory with class representation. The bot reader 1102 takes as input a bot file and generates an in-memory bot structure. A bot dependency generator 1104 identifies and creates a dependency graph for a given bot. It includes any child bot, resource file like script, and document or image used while creating a bot. The bot dependency generator 1104 takes, as input, the output of the bot reader 1102 and provides, as output, a list of direct and transitive bot dependencies. A script handler 1106 handles script execution by injecting a contract into a user script file. The script handler 1106 registers an external script in manifest and bundles the script as a resource in an output JAR. The script handler 1106 takes, as input, the output of the bot reader 1102 and provides, as output, a list of function pointers to execute different types of identified scripts like Python, Java, VB scripts.

An entry class generator 1108 can create a Java class with an entry method, to permit bot execution to be started from that point. For example, the entry class generator 1108 takes, as an input, a parent bot name, such "Invoice-processing-.bot" and generates a Java class having a contract method with a predefined signature. A bot class generator 1110 can generate a bot class and orders command code in sequence of execution. The bot class generator 1110 can take, as input, an in-memory bot structure and generates, as output, a Java class in a predefined structure. A Command/Iterator/Conditional Code Generator 1112 wires up a command class with singleton object creation, manages nested command linking, iterator (loop) generation, and conditional (If/Else If/Else) construct generation. The Command/Iterator/Conditional Code Generator 1112 can take, as input, an in-memory bot structure in JSON format and generates Java code within the bot class. A variable code generator 1114 generates code for user defined variables in the bot, maps bot level data types to Java language compatible types, and assigns initial values provided by user. The variable code generator 1114 takes, as input, an in-memory bot structure and generates Java code within the bot class. A schema validator 1116 can validate user inputs based on command schema and includes syntax and semantic checks on user provided values. The schema validator 1116 can take, as input, an in-memory bot structure and generates validation errors that it detects. The attribute code generator 1118 can generate attribute code, handles the nested nature of attributes, and transforms bot value types to Java language compatible types. The attribute code generator 1118 takes, as input, an in-memory bot structure and generates Java code within the bot class. A utility classes generator 1120 can generate utility classes which are used by an entry class or bot class methods. The utility classes generator 1120 can generate, as output, Java classes. A data type generator 1122 can generate value types useful at runtime. The data type generator 1122 can generate, as output, Java classes. An expression generator 1124 can evaluate user inputs and generates compatible Java code, identifies complex variable mixed user inputs, inject variable values, and transform mathematical expressions. The expression generator 1124 can take, as input, user defined values and generates, as output, Java compatible expressions.

The JAR generator 1128 can compile Java source files, produces byte code and packs everything in a single JAR, including other child bots and file dependencies. The JAR generator 1128 can take, as input, generated Java files, resource files used during the bot creation, bot compiler dependencies, and command packages, and then can generate a JAR artifact as an output. The JAR cache manager 1130 can put a bot JAR in cache repository so that recompilation can be avoided if the bot has not been modified since the last cache entry. The JAR cache manager 1130 can take, as input, a bot JAR.

In one or more embodiment described herein command action logic can be implemented by commands 1001 available at the control room 808. This permits the execution environment on a device 810 and/or 815, such as exists in a user session 818, to be agnostic to changes in the command action logic implemented by a bot 804. In other words, the manner in which a command implemented by a bot 804 operates need not be visible to the execution environment in which a bot 804 operates. The execution environment is able to be independent of the command action logic of any commands implemented by bots 804. The result is that changes in any commands 1001 supported by the RPA system 800, or addition of new commands 1001 to the RPA system 800, do not require an update of the execution environment on devices 810, 815. This avoids what can be a time and resource intensive process in which addition of a new command 1001 or change to any command 1001 requires an update to the execution environment to each device 810, 815 employed in an RPA system. Take, for example, a bot that employs a command 1001 that logs into an on-online service. The command 1001 upon execution takes a Uniform Resource Locator (URL), opens (or selects) a browser, retrieves credentials corresponding to a user on behalf of whom the bot is logging in as, and enters the user credentials (e.g., username and password) as specified. If the command 1001 is changed, for example, to perform two-factor authentication, then it will require an additional resource (the second factor for authentication) and will perform additional actions beyond those performed by the original command (for example, logging into an email account to retrieve the second factor and entering the second factor). The command action logic will have changed as the bot is required to perform the additional changes. Any bot(s) that employ the changed command will need to be recompiled to generate a new bot JAR for each changed bot and the new bot JAR will need to be provided to a bot runner upon request by the bot runner. The execution environment on the device that is requesting the updated bot will not need to be updated as the command action logic of the changed command is reflected in the new bot JAR containing the byte code to be executed by the execution environment.

The embodiments herein can be implemented in the general context of computer-executable instructions, such as those included in program modules, being executed in a computing system on a target, real or virtual, processor. Generally, program modules include routines, programs, libraries, objects, classes, components, data structures, etc. that perform particular tasks or implement particular abstract data types. The program modules may be obtained from another computer system, such as via the Internet, by downloading the program modules from the other computer system for execution on one or more different computer systems. The functionality of the program modules may be combined or split between program modules as desired in various embodiments. Computer-executable instructions for program modules may be executed within a local or distributed computing system. The computer-executable instructions, which may include data, instructions, and configuration parameters, may be provided via an article of manufacture including a computer readable medium, which provides content that represents instructions that can be executed. A computer readable medium may also include a storage or database from which content can be downloaded. A computer readable medium may further include a device or product having content stored thereon at a time of sale or delivery. Thus, delivering a device with stored content, or offering content for download over a communication medium, may be understood as providing an article of manufacture with such content described herein.

Figure 12:
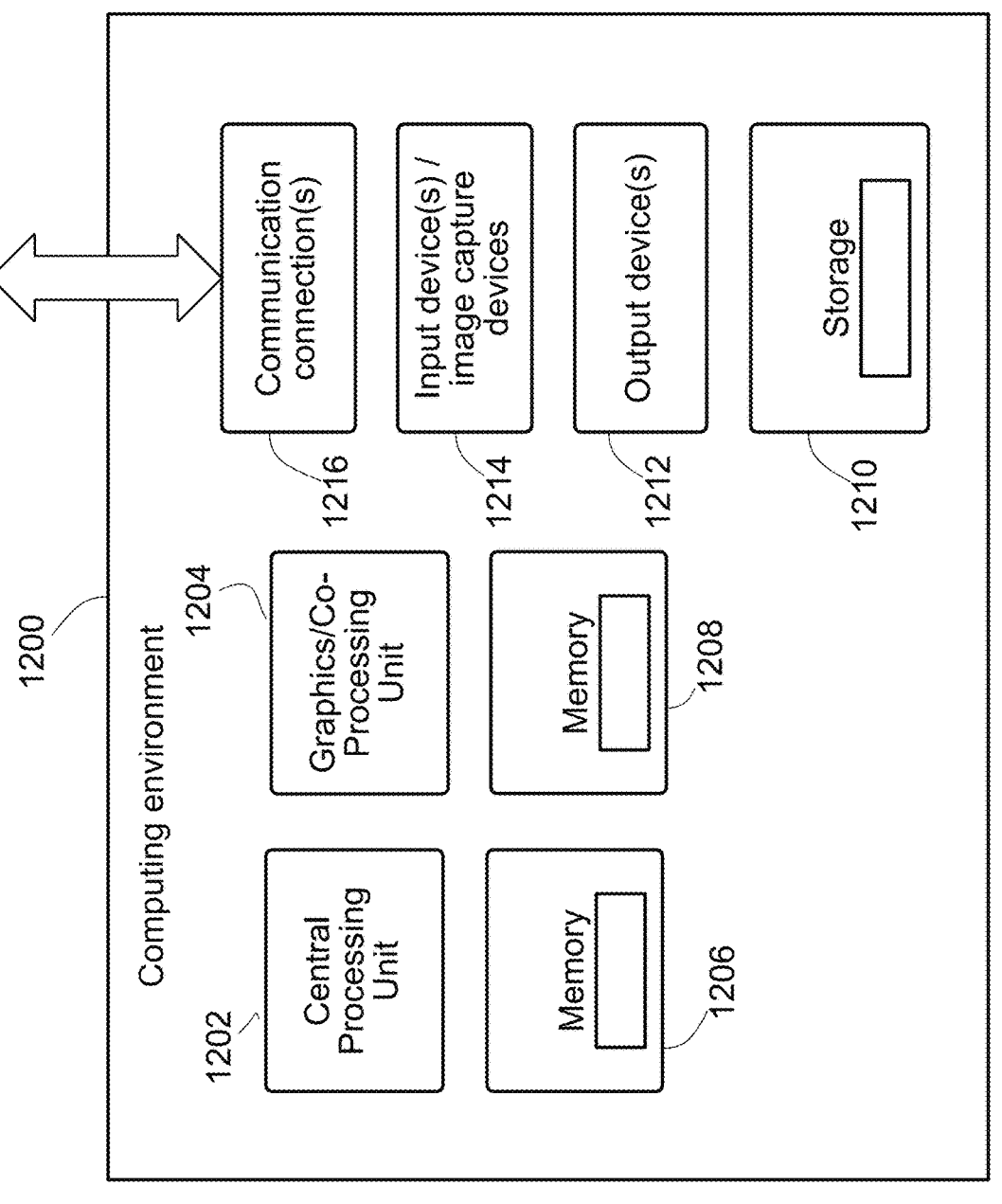
FIG. 12 illustrates a block diagram of an exemplary computing environment for an implementation of an RPA system, such as the RPA systems disclosed herein.

FIG. 12 illustrates a block diagram of an exemplary computing environment 1200 for an implementation of an RPA system, such as the RPA systems disclosed herein. The embodiments described herein may be implemented using the exemplary computing environment 1200. The exemplary computing environment 1200 includes one or more processing units 1202, 1204 and memory 1206, 1208. The processing units 1202, 1206 execute computer-executable instructions. Each of the processing units 1202, 1206 can be a general-purpose central processing unit (CPU), processor in an application-specific integrated circuit (ASIC) or any other type of processor. For example, as shown in FIG. 12, the processing unit 1202 can be a CPU, and the processing unit can be a graphics/co-processing unit (GPU). The tangible memory 1206, 1208 may be volatile memory (e.g., registers, cache, RAM), non-volatile memory (e.g., ROM, EEPROM, flash memory, etc.), or some combination of the two, accessible by the processing unit(s). The hardware components may be standard hardware components, or alternatively, some embodiments may employ specialized hardware components to further increase the operating efficiency and speed with which the RPA system operates. The various components of exemplary computing environment 1200 may be rearranged in various embodiments, and some embodiments may not require nor include all of the above components, while other embodiments may include additional components, such as specialized processors and additional memory.

The exemplary computing environment 1200 may have additional features such as, for example, tangible storage 1210, one or more input devices 1214, one or more output devices 1212, and one or more communication connections 1216. An interconnection mechanism (not shown) such as a bus, controller, or network can interconnect the various components of the exemplary computing environment 1200. Typically, operating system software (not shown) provides an operating system for other software executing in the exemplary computing environment 1200, and coordinates activities of the various components of the exemplary computing environment 1200.

The tangible storage 1210 may be removable or non-removable, and includes magnetic disks, magnetic tapes or cassettes, CD-ROMs, DVDs, or any other medium which can be used to store information in a non-transitory way, and which can be accessed within the computing system 1200. The tangible storage 1210 can store instructions for the software implementing one or more features of a PRA system as described herein.

The input device(s) or image capture device(s) 1214 may include, for example, one or more of a touch input device (such as a keyboard, mouse, pen, or trackball), a voice input device, a scanning device, an imaging sensor, touch surface, or any other device capable of providing input to the exemplary computing environment 1200. For multimedia embodiment, the input device(s) 1214 can, for example, include a camera, a video card, a TV tuner card, or similar device that accepts video input in analog or digital form, a microphone, an audio card, or a CD-ROM or CD-RW that reads audio/video samples into the exemplary computing environment 1200. The output device(s) 1212 can, for example, include a display, a printer, a speaker, a CD-writer, or any another device that provides output from the exemplary computing environment 1200.

The one or more communication connections 1216 can enable communication over a communication medium to another computing entity. The communication medium conveys information such as computer-executable instructions, audio or video input or output, or other data. The communication medium can include a wireless medium, a wired medium, or a combination thereof.

The various aspects, features, embodiments or implementations of the invention described above can be used alone or in various combinations.

Embodiments of the invention can, for example, be implemented by software, hardware, or a combination of hardware and software. Embodiments of the invention can also be embodied as computer readable code on a computer readable medium. In one embodiment, the computer readable medium is non-transitory. The computer readable medium is any data storage device that can store data which can thereafter be read by a computer system. Examples of the computer readable medium generally include read-only memory and random-access memory. More specific examples of computer readable medium are tangible and include Flash memory, EEPROM memory, memory card, CD-ROM, DVD, hard drive, magnetic tape, and optical data storage device. The computer readable medium can also be distributed over network-coupled computer systems so that the computer readable code is stored and executed in a distributed fashion.

Numerous specific details are set forth in order to provide a thorough understanding of the present invention. However, it will become obvious to those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

In the foregoing description, reference to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A computer-implemented process automation system for extracting data from one or more documents, comprising:

a data extraction module configured to use artificial intelligence or machine learning to extract data from an image of a document; and an automated feedback-based modification module configured to process the extracted data to modify at least one data item within the extracted data, the at least one data item of the extracted data being modified in an automated manner based on a feedback file suitable for use with the document, the automated feedback-based modification module configured to at least:

determine a document fingerprint for the document;

determine the feedback file that is suitable for use with the document based on the document fingerprint;

retrieve guidance from the feedback file for the at least one data item of the extracted data being modified; and automatically modify the at least one data item of the extracted data being modified based on the guidance retrieved from the feedback file.

2. A computer-implemented process automation system as recited in claim 1, wherein the automatically modifying of the at least one data item of the extracted data operates to correct, alter or replace of at least a portion of the data extracted.

3. A computer-implemented process automation system as recited in claim 1, wherein the system comprises:

a user validation module configured to process the extracted data to manually validate at least another data item within the extracted data that needs validation.

4. A computer-implemented process automation system as recited in claim 3, wherein the amount of user validation, via the user validation module, needed for the extracted data is reduced by operation of the automated feedback-based modification module.

5. A computer-implemented process automation system as recited in claim 3, wherein the user validation module receives user input to validate the at least another data item.

6. A computer-implemented process automation system as recited in claim 5, wherein the system comprises:

a feedback file creation/modification module configured to at least create a new feedback file or update the existing feedback file based on the received user input.

7. A computer-implemented process automation system as recited in claim 1, wherein the automated feedback-based modification module includes or couples to a feedback management module, the feedback management module being configured to locate the feedback file that is suitable for use with the document based on the document fingerprint.

8. A computer-implemented process automation system as recited in claim 7, wherein the feedback file is associated with a document cluster, and wherein the feedback management module includes or couples to a document cluster search module that compares the document fingerprint with one or more cluster fingerprints associate with one or more document clusters.

9. A computer-implemented process automation system as recited in claim 1, wherein the guidance received from the feedback file includes or is derived from descriptive data for prior user validations stored in the feedback file.

10. A computer-implemented process automation system as recited in claim 9, wherein the descriptive data for prior user validations includes at least object name, and positional coordinates for where its value is located within a document.

11. A computer-implemented process automation system as recited in claim 10, wherein the descriptive data for prior user validations further includes one or more of: block type, key value orientation, data type, graphic anchor, key value anchor, total line segments, total vertical lines, and extraction error type.

12. A computer-implemented process automation system as recited in claim 1, wherein the automated feedback-based modification module is configured to retrieve the guidance by at least:

identifying a corresponding object with the identified feedback file, the corresponding object corresponding to the at least one data item of the extracted data being evaluated; and retrieving feedback data pertaining to the corresponding object from the identified feedback file.

13. A computer-implemented process automation system as recited in claim 12, wherein the automated feedback-based modification module is configured to modify the at least one data item of the extracted data by at least:

locating the identified object at a particular location within the document using at least a portion of the retrieved feedback data; and performing subsequent data extraction processing at the particular location to extract a value pertaining to the identified object in the document.

14. A computer-implemented method as recited in claim 13, wherein the automated feedback-based modification module is configured to modify the at least one data item of the extracted data by at least:

replacing the at least one data item of the extracted data with the value, the at least one data item of the extracted data being obtained from original data extraction processing.

15. A computer-implemented method as recited in claim 13, wherein the retrieved feedback data includes at least positional data based on where the corresponding object was previously found in the document, the positional data identifying the particular location.

16. A computer-implemented method for enhancing extracted data from an image of a document, the method comprising:

determining a document fingerprint for the document;

identifying a feedback file that is suitable for use with the document based on the document fingerprint;

retrieving guidance from the identified feedback file pertaining to at least one data item of the extracted data being evaluated; and enhancing the at least one data item of the extracted data being evaluated based on the guidance retrieved from the identified feedback file.

17. A computer-implemented method as recited in claim 16, wherein the at least one data item of the extracted data being evaluated includes at least one identified object that is noted as not being successfully extracted from the document, and wherein the guidance retrieved from the identified feedback file pertaining to at least one data item of the extracted data being evaluated pertains to the same object as the identified object.

18. A computer-implemented method as recited in claim 16, wherein the retrieving guidance comprises:

identifying a corresponding object with the identified feedback file, the corresponding object corresponding to the at least one data item of the extracted data being evaluated; and retrieving feedback data pertaining to the corresponding object from the identified feedback file.

19. A computer-implemented method as recited in claim 18, wherein the enhancing of the at least one data item of the extracted data comprises:

locating the identified object at a particular location within the document using at least a portion of the retrieved feedback data; and performing subsequent data extraction processing at the particular location to extract a value pertaining to the identified object in the document.

20. A computer-implemented method as recited in claim 19, wherein the enhancing of the at least one data item of the extracted data comprises:

replacing the at least one data item of the extracted data with the value, the at least one data item of the extracted data being obtained from original data extraction processing.

21. A computer-implemented method as recited in claim 19, wherein the retrieved feedback data includes at least positional data based on where the corresponding object was previously found in the document, the positional data identifying the particular location.

22. A computer-implemented method as recited in claim 16, wherein the method comprises:

user validating at least another data item within the extracted data that needs validation after the automatically enhancement of the at least one data item of the extracted data has been performed in an automated manner.

23. A computer-implemented method as recited in claim 22, wherein the user validating receives user input to validate the at least another data item, and wherein the method comprises:

following the user validating, updating the feedback file based on the received user input.

24. A computer-implemented method as recited in claim 16, wherein the determining the document fingerprint for the document comprises:

determining objects within the extracted data for at least a portion of the document;

determining, from the extracted data, positional information for the determined objects within the document; and forming the document fingerprint for the document based on at least the determined objects and the determined positional information.

25. A computer-implemented method as recited in claim 24, wherein the identifying of the feedback file that is suitable for use with the document based on the document fingerprint comprises:

searching of a plurality of document clusters for a document cluster that matches the document fingerprint for the document, each of the document clusters having a feedback file; and retrieving the feedback file associated with the matching document cluster, the retrieved feedback file being used as the identified feedback file that is suitable for user with the document.

26. A computer-implemented method as recited in claim 25, wherein the method comprises:

forming a new document cluster if the searching of the plurality of document clusters in unable to find a document cluster that matches the document fingerprint.

27. A computer-implemented method as recited in claim 26, wherein the new document cluster is assigned a cluster fingerprint based on the document fingerprint for the document.

28. Computer-implemented method as recited in claim 25, wherein each of the plurality of document clusters have a cluster fingerprint, and wherein the searching of the plurality of document clusters for a document cluster that matches the document fingerprint for the document, comprises:

comparing the document fingerprint to one or more of the cluster fingerprints corresponding to one or more of the document clusters; and determining whether the document fingerprint matches any of the one or more of the cluster fingerprints based on the comparing.

29. Computer-implemented method as recited in claim 28, wherein the document fingerprint and the one or more cluster fingerprints include at least (i) a plurality of keys and (ii) positional references for each of the keys.

30. A computer-implemented method as recited in claim 28, wherein each of the document fingerprint and the one or more cluster fingerprints include at least a plurality of objects, and wherein the determining whether the document fingerprint matches any of the one or more cluster fingerprints is based on at least a predetermined percentage of the objects matching exactly or within a threshold amount.

31. A computer-implemented method as recited in claim 30, wherein the objects pertain to at least one data item of the extracted data.

32. A computer-implemented method as recited in claim 30, wherein the objects pertain to keys and/or the positional references, and wherein the determining whether the document fingerprint matches any of the one or more cluster fingerprints is based on at least a predetermined percentage of the keys and/r the positional references matching exactly or within a threshold amount.

33. A computer-implemented method as recited in claim 16, wherein retrieving the guidance from the feedback file pertaining to at least one data item of the extracted data being evaluated comprises:

parsing the feedback file for the guidance based on attributes of at least one data item of the extracted data being evaluated.

34. A computer-implemented method as recited in claim 33, wherein the enhancing the extracted data based on the guidance retrieved from the identified feedback file, comprises:

correcting at least the portion of the extracted data based on the guidance being retrieved from the parsing of the identified feedback file.

35. A computer-implemented method as recited in claim 16, wherein the enhancing of the at least one data item of the extracted data being evaluated, comprises:

modifying the at least one data item of the extracted data based on the guidance retrieved from the identified feedback file to correct, alter or replace at least a portion of the data extracted.

36. A computer-implemented method as recited in claim 16, wherein retrieving the guidance from the feedback file pertaining to at least one data item of the extracted data being evaluated comprises:

identifying the at least one data item from the extracted data that is to be modified;

determining a type and position of the identified data item; and parsing the feedback file for the guidance from the feedback file pertaining to the at least one data item based on the type and position of the identified data item.

* * * * *